(12) United States Patent
Sun

(10) Patent No.: US 11,975,603 B2
(45) Date of Patent: May 7, 2024

(54) FLIP COVER ACTUATION ASSEMBLY, AND REFUELING PORT OR CHARGING PORT FLIP COVER ASSEMBLY COMPRISING SAME

(71) Applicant: ILLINOIS TOOL WORKS INC., Glenview, IL (US)

(72) Inventor: Yuan Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 404 days.

(21) Appl. No.: 17/515,821

(22) Filed: Nov. 1, 2021

(65) Prior Publication Data
US 2022/0136291 A1 May 5, 2022

(30) Foreign Application Priority Data
Nov. 1, 2020 (CN) .......................... 202011199311.7

(51) Int. Cl.
*B60K 15/05* (2006.01)
*E05B 81/06* (2014.01)
(Continued)

(52) U.S. Cl.
CPC .............. *B60K 15/05* (2013.01); *E05B 81/06* (2013.01); *E05B 81/18* (2013.01); *E05B 81/30* (2013.01);
(Continued)

(58) Field of Classification Search
CPC ............ B60K 15/05; B60K 2015/0507; B60K 2015/0515; B60K 2015/053; B60K 2015/0535; B60K 2015/0538; B60K 2015/0568; B60K 2015/0553; B60K 2015/0584; B60K 2015/0561
(Continued)

(56) References Cited

U.S. PATENT DOCUMENTS

2011/0285166 A1* 11/2011 Baba ................... E05D 11/1007
296/97.22

FOREIGN PATENT DOCUMENTS

CN  108001214 A  * 5/2018 ............. B60K 15/05
CN  207549950 U  * 6/2018
(Continued)

OTHER PUBLICATIONS

EP-3231972 Translation—2017 (Year: 2017).*
(Continued)

*Primary Examiner* — Dennis H Pedder
(74) *Attorney, Agent, or Firm* — Quarles & Brady LLP

(57) ABSTRACT

A flip cover actuation assembly for actuating a flip cover is movably mounted on a base. The flip cover actuation assembly has a locking means, a hinge means, a drive shaft and a drive member. The drive shaft has a fitting portion. The hinge means is installed around the fitting portion. An engagement structure is provided on a receiving portion of the hinge means. The engagement structure enables the receiving portion and the fitting portion to rotatably engage or separate such that the drive shaft moves the flip cover relative to the hinge means. The locking or releasing of the flip cover and the opening and closing of the flip cover is achieved by the drive shaft with the drive member. In addition, the releasing and the opening of the flip cover are achieved at different times to avoid any interferences.

12 Claims, 16 Drawing Sheets

(51) Int. Cl.
    *E05B 81/18*    (2014.01)
    *E05B 81/30*    (2014.01)
    *E05B 81/42*    (2014.01)
    *E05B 83/34*    (2014.01)
    *E05F 15/63*    (2015.01)
(52) U.S. Cl.
    CPC .............. *E05B 81/42* (2013.01); *E05B 83/34* (2013.01); *E05F 15/63* (2015.01); *B60K 2015/053* (2013.01); *B60K 2015/0538* (2013.01); *B60K 2015/0561* (2013.01); *B60K 2015/0569* (2013.01); *E05Y 2201/434* (2013.01); *E05Y 2201/624* (2013.01); *E05Y 2201/638* (2013.01); *E05Y 2900/534* (2013.01)
(58) Field of Classification Search
    USPC ..................................................... 296/97.22
    See application file for complete search history.

(56) References Cited

FOREIGN PATENT DOCUMENTS

| | | | | |
|---|---|---|---|---|
| DE | 102012018900 B3 | * | 7/2013 | .............. B60K 15/04 |
| DE | 102014115907 A1 | * | 5/2016 | .............. B60K 15/05 |
| DE | 102019128551 A1 | * | 4/2020 | .............. B60K 15/05 |
| EP | 3231972 A1 | * | 10/2017 | .............. B60K 15/05 |
| WO | WO-2013189560 A1 | * | 12/2013 | ............... B60K 1/00 |

OTHER PUBLICATIONS

DE102019128551 Translation—2020 (Year: 2020).*
DE102014117907 Translation—2016 (Year: 2016).*
DE102012018900 Translation—2013 (Year: 2013).*
CN-20754950 Translation (Year: 2018).*
CN-108001214 Translation (Year: 2018).*
WO-2013189560 Translation (Year: 2013).*

* cited by examiner

FLIP COVER ACTUATION ASSEMBLY, AND REFUELING PORT OR CHARGING PORT FLIP COVER ASSEMBLY COMPRISING SAME

CROSS REFERENCE TO RELATED APPLICATIONS

This application claims priority to Chinese Application Serial No. 202011199311.7, filed on Nov. 1, 2020, and entitled "Flip Cover Actuation Assembly, and Refueling Port or Charging Port Flip Cover Assembly Comprising Same," which is incorporated by reference in its entirety.

TECHNICAL FIELD

The present disclosure relates to a flip cover assembly, and in particular to a flip cover assembly for a refueling port or a charging port of a vehicle.

BACKGROUND

A refueling port or charging port flip cover of a vehicle is movably mounted on a vehicle body and configured to open or close a refueling port or charging port of the vehicle. When refueling or charging is not required, the refueling port or charging port flip cover needs to be locked in a closed position by a locking means. When refueling or charging is required, the flip cover needs to be released by the locking means so that the flip cover can be moved from the closed position to an open position. That is to say, when the flip cover is to be moved from the closed position to the open position, the flip cover needs to be released by the locking means before being opened.

SUMMARY OF THE DISCLOSURE

The present disclosure provides an improved flip cover actuation assembly to effectively actuate an opening/closing action and a locking action of a refueling port or charging port flip cover.

In order to solve the above problem, in a first aspect, the present disclosure provides a flip cover actuation assembly for actuating a flip cover movably mounted on a base, the flip cover actuation assembly comprising: a locking means movably disposed on the base, the locking means being configured to lock or release the flip cover; a hinge means comprising connecting portions through which the hinge means is connected to the flip cover, and receiving portions; and a drive shaft and a drive member, the drive member being disposed on the drive shaft and rotating with rotation of the drive shaft, the drive member being configured to drive the locking means to move, the drive shaft comprising a fitting portion, the hinge means being installed around the fitting portion of the drive shaft through the receiving portion, wherein an engagement structure is provided on the receiving portion of the hinge means and the fitting portion of the drive shaft, and the engagement structure is configured to enable the receiving portion and the fitting portion to be rotatably engaged or rotatably separated such that the drive shaft can drive the flip cover to move or rotate relative to the hinge means through the hinge means.

According to the first aspect described above, the locking means has a locking position and a release position, the locking means is configured to lock the flip cover when the locking means is in the locking position and to release the flip cover when the locking means is in the release position, wherein the engagement structure is configured to: during movement of the locking means from the locking position to the release position, the receiving portion can be rotatably separated from the fitting portion such that the drive shaft rotates relative to the hinge means, and when the receiving portion is rotatably engaged with the fitting portion, such that the drive shaft drives the hinge means to rotate so as to open the flip cover, the locking means is in the release position.

According to the first aspect described above, the engagement structure comprises at least one shaft drive protrusion disposed on the fitting portion and at least one protrusion receiving cavity disposed in the receiving portion, the at least one shaft drive protrusion extending outward from an outer periphery of the drive shaft, the at least one shaft drive protrusion being received in the at least one protrusion receiving cavity, wherein a circumferential dimension of the at least one protrusion receiving cavity is larger than that of the at least one shaft drive protrusion.

According to the first aspect described above, the receiving portion comprises a shaft hole, and the at least one protrusion receiving cavity extends radially outward from the shaft hole and communicates with the shaft hole.

According to the first aspect described above, the drive shaft and the drive member are integrally formed.

According to the first aspect described above, the drive shaft is connected to the hinge means on one side of the drive member and to a power source on the opposite side.

According to the first aspect described above, the locking means is a locking rod, and the movement direction of the locking rod is parallel to an axial direction of the drive shaft.

According to the first aspect described above, the drive member comprises a drive portion rotatable about an axis of the drive shaft; the locking rod is provided with a driven end, the driven end is provided with a driven inclined plane, the driven inclined plane is obliquely disposed relative to the movement direction of the locking rod, and the driven inclined plane is disposed facing the drive portion; and the drive portion and the driven inclined plane are configured such that, with the rotation of the drive portion, the drive portion can contact the driven inclined plane to drive the locking rod to move from the locking position to the release position.

According to the first aspect described above, the driven end further comprises an engagement surface at an end of the driven inclined plane, and the locking rod is configured such that when the locking rod reaches the release position, the engagement surface can abut against the drive member.

According to the first aspect described above, the flip cover actuation assembly further comprises a return spring connected between the locking rod and the base, the return spring being configured to be compressed during movement of the locking rod toward the release position, after the locking rod reaches the release position, the return spring and the drive member collectively keeping the locking rod in the release position, and a return force of the return spring can move the locking rod from the release position to the locking position.

According to the first aspect described above, the drive member is a drive disk having a radially recessed notch in a circumferential surface thereof, the drive portion is formed by the notch and the circumferential surface of the drive disk, and the drive disk is configured such that the notch receives the driven end of the locking rod when the drive portion contacts the driven inclined plane.

In a second aspect, the present disclosure provides a refueling port or charging port flip cover assembly, comprising: a base; a flip cover rotatably mounted on the base; and a flip cover actuation assembly according to any one of the embodiments in the first aspect, the flip cover actuation assembly being disposed on the base.

The concept, specific structures and resulting technical effects of the present disclosure are further described below in conjunction with the accompanying drawings so as to fully understand the objective, features and effects of the present disclosure.

DETAILED DESCRIPTION OF EMBODIMENTS

Various specific embodiments of the present disclosure will be described below with reference to the accompanying drawings which constitute part of this description. It should be understood that although the terms for indicating orientations, such as "front", "rear", "upper", "lower", "left", "right", "top", "bottom", "inner", "outer", "head" and "tail" are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are merely illustrative and should not be considered as limitations.

Figure 1A:
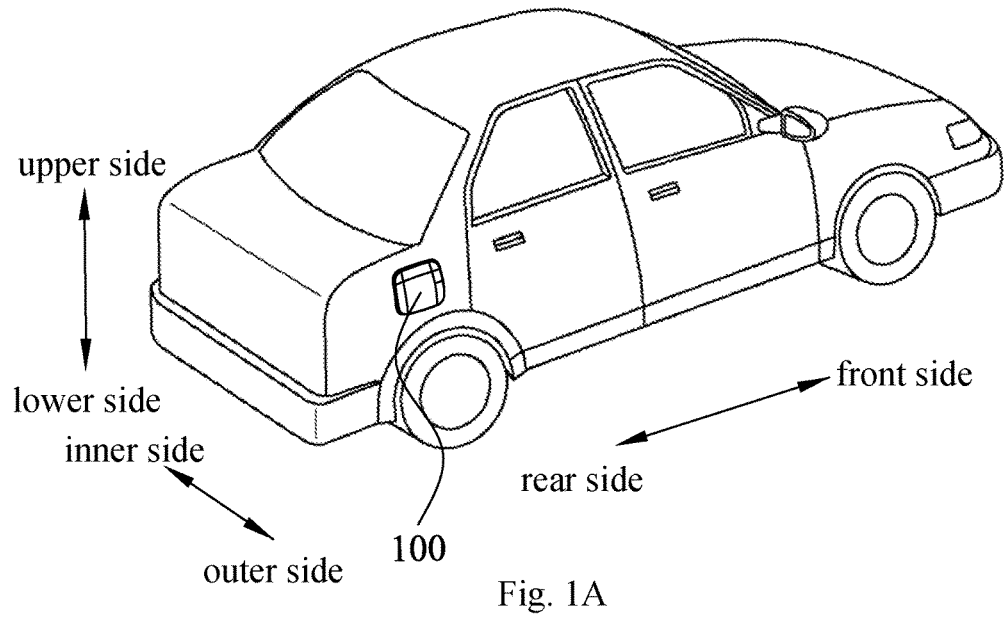
FIG. 1A is a structural schematic diagram of a flip cover assembly of the present disclosure mounted on a vehicle body.
Figure 1B:
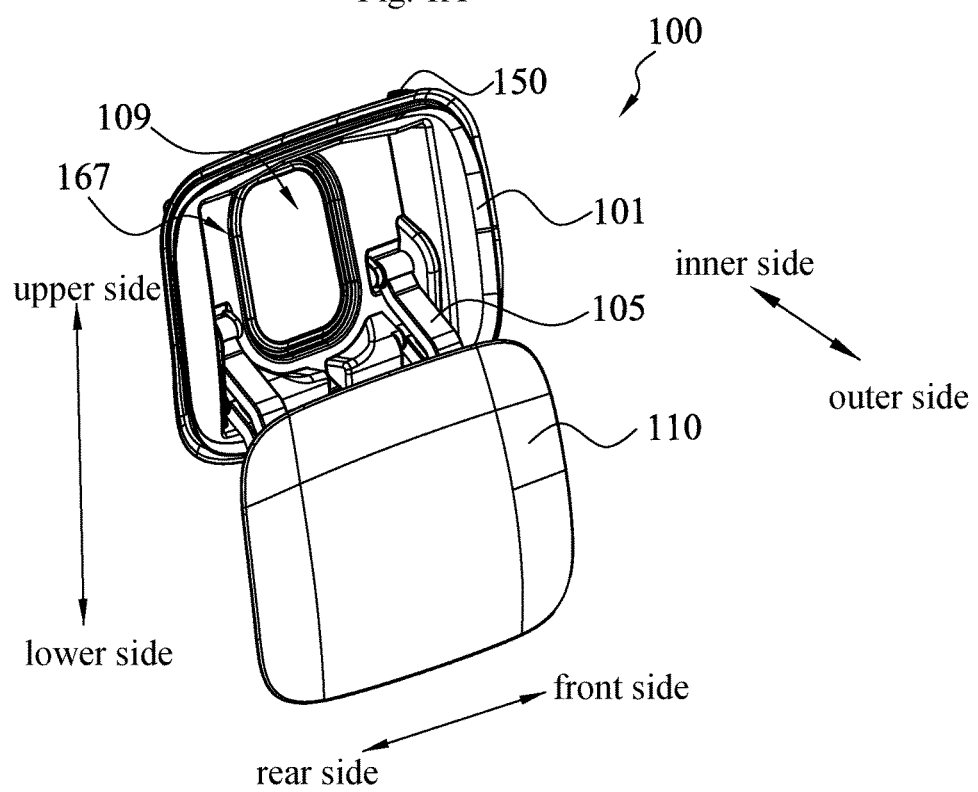
FIG. 1B is a perspective view of the flip cover assembly shown in FIG. 1A in an open state.
Figure 1C:
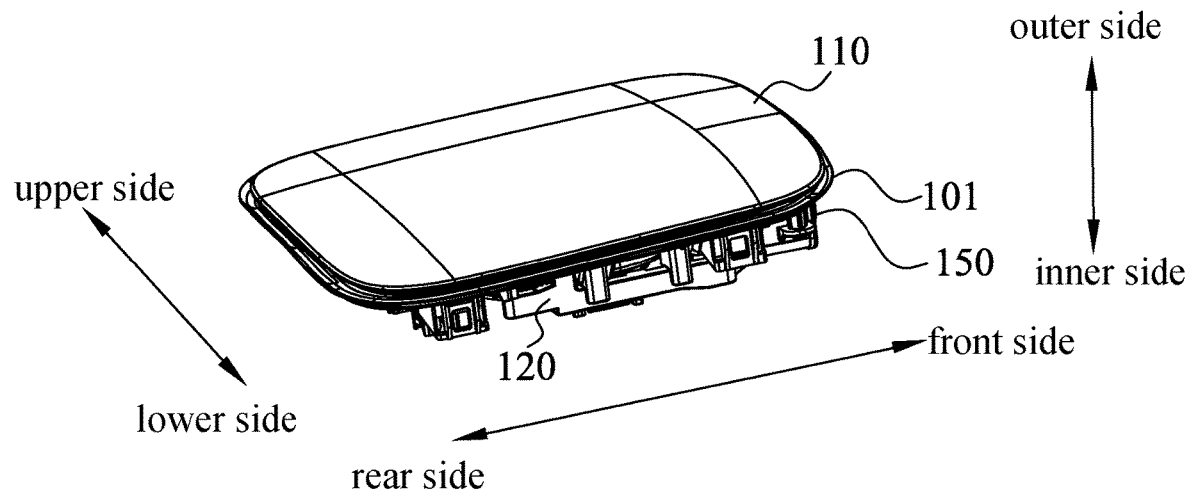
FIG. 1C is a perspective view of the flip cover assembly shown in FIG. 1A in a closed state.
Figure 1D:
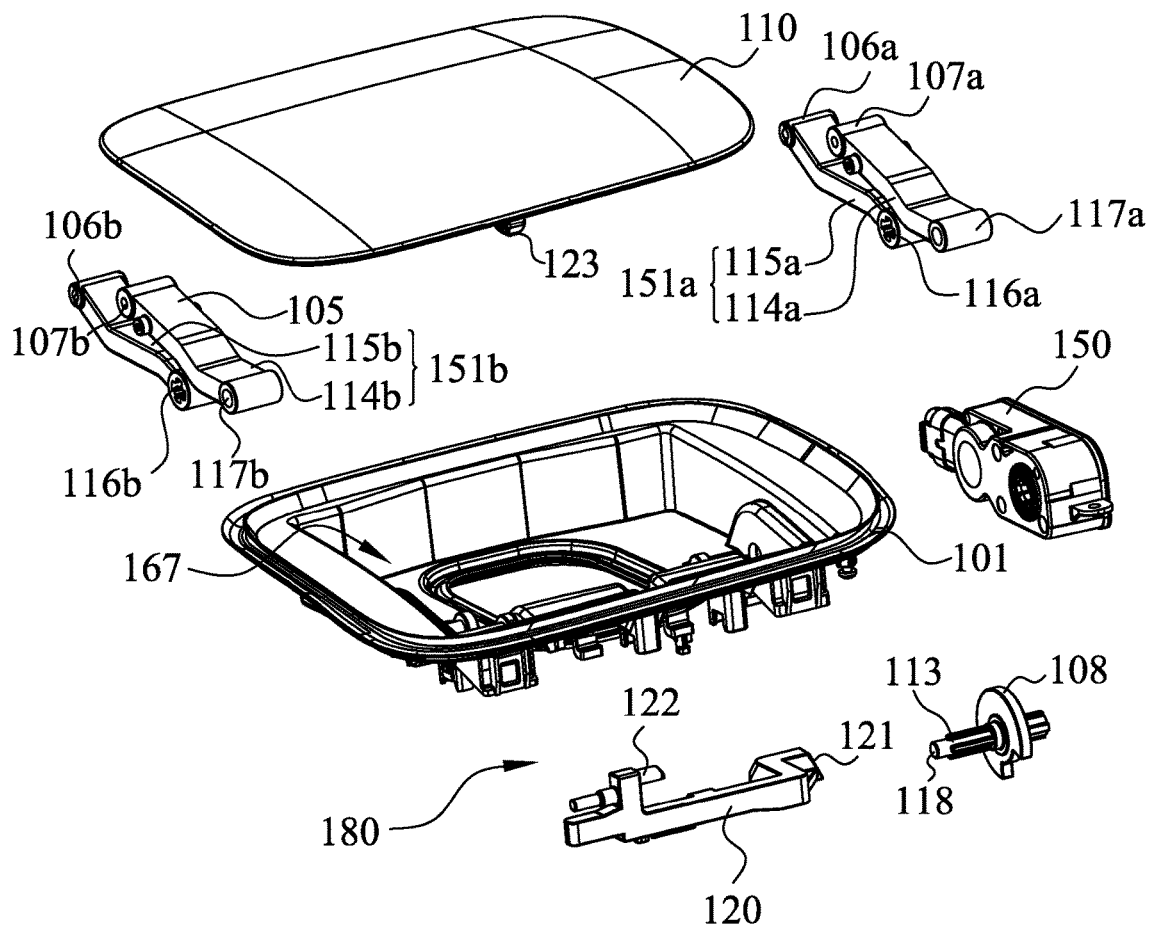
FIG. 1D is an exploded view of the flip cover assembly shown in FIG. 1C.

FIGS. 1A-1D are structural diagrams of an embodiment of a refueling port or charging port flip cover assembly 100 (hereinafter called "flip cover assembly 100") of the present disclosure, for illustrating components of the flip cover assembly 100 and their general positional relationships. FIG. 1A illustrates a structural schematic diagram of the flip cover assembly 100 mounted on a vehicle body, FIG. 1B is a perspective view of the flip cover assembly 100 in an open state, FIG. 1C is a perspective view of the flip cover assembly 100 in a closed state, and FIG. 1D is an exploded view of the flip cover assembly 100.

As shown in FIG. 1A, the flip cover assembly 100 of the present disclosure is configured to be mounted on the vehicle body. For convenience of illustration and description, the orientation of the flip cover assembly 100 will be described with a vehicle as a reference after the flip cover assembly 100 has been mounted on the vehicle body. Specifically, the side of the vehicle body on which the flip cover assembly 100 is disposed is defined as the outer side and the side opposite to the outer side is defined as the inner side, and the flip cover assembly 100 is mounted to the vehicle body in a direction toward the inner side. The side of a base 101 of the flip cover assembly 100 on which a power source 150 is disposed is defined as the front side, and the side opposite to the front side is defined as the rear side. Moreover, the upper side of the flip cover assembly 100 in FIG. 1A is defined as the upper side, and the other end opposite to the upper side is defined as the lower side. A flip cover 110 in the flip cover assembly 100 in FIG. 1A can be moved toward the lower side to expose a refueling port or a charging port 109 on the inner side of the flip cover 110.

As shown in FIGS. 1B-1D, the flip cover assembly 100 comprises the base 101, the flip cover 110, and a flip cover actuation assembly 180 configured to actuate the flip cover 110. The flip cover actuation assembly 180 comprises: the power source 150, a locking means 120, a hinge means 105, a drive shaft 118, and a drive member 108. The base 101 is configured to be fixedly mounted on the vehicle body, and the flip cover 110 is connected to the base 101 by means of the hinge means 105. The hinge means 105 is configured to move the flip cover 110 relative to the base 101 to an open position or a closed position such that a receiving cavity 167 of the base 101 is opened to expose the refueling port or the charging port 109 in the receiving cavity 167, or the receiving cavity 167 of the base 101 is closed to cover the refueling port or the charging port 109 in the receiving cavity 167. The locking means 120 is connected to the lower side of the base 101, and is configured to be movable in front and rear directions to lock or release the flip cover 110. The power source 150 is connected to the front side of the base 101. The drive shaft 118 is connected between the power source 150 and the hinge means 105 to provide a driving force from the power source 150 to the hinge means 105 by means of the drive shaft 118. The drive member 108 is disposed on the drive shaft 118 and rotates with rotation of the drive shaft 118, and the drive member 108 can drive the locking means 120 to move in the front and rear directions.

Specifically, in this embodiment, the hinge means 105 comprises two pairs of hinge arms 151a and 151b disposed symmetrical to each other in the front and rear directions, and a first pair of hinge arms 151a is disposed on the front side of a second pair of hinge arms 151b. A parallel four-link mechanism is generally formed between the base 101 and the flip cover 110 and the hinge arms 151a and 151b such that the flip cover 110 can be moved up or down to the open position or the closed position while maintaining a state of being substantially parallel to the base 101. In the hinge means 105, the first pair of hinge arms 151a includes a hinge arm 114a and a hinge arm 115a, and the second pair of hinge arms 151b also includes a hinge arm 114b and a hinge arm 115b. The hinge arms 114a, 114b have connecting portions 107a, 107b and receiving portions 117a, 117b, and the hinge arms 115a, 115b also have connecting portions 106a, 106b and receiving portions 116a, 116b. The hinge arms 114a, 114b and the hinge arms 115a, 115b are pivotally connected to the flip cover 110 by means of the respective connecting portions 107a, 107b and connecting portions 106a, 106b respectively, and are pivotally connected within the base 101 by means of the receiving portions 117a, 117b and the receiving portions 116a, 116b respectively. The hinge means 105 is configured to support the movement of the flip cover 110 relative to base 101 by means of the movement of the hinge means 105 relative to the base 101. Such a parallel four-link mechanism enables the opening or closing movement of the flip cover 110 to be more stable and reliable. In some other embodiments, the hinge means may comprise only one pair of hinge arms for forming a parallel four-link mechanism. Moreover, in some other embodiments, the hinge means may also be configured not to form a parallel four-link mechanism, but to drive the flip cover 110 to rotate relative to the base 101 to open or close the flip cover assembly 100. A specific structure of the hinge means 105 will be described in detail later with reference to FIG. 2B.

Still as shown in FIGS. 1B-1D, the locking means 120 is provided with a locking pin 122, and an inner surface of the lower side of the flip cover 110 is provided with a locking hook 123. The locking means 120 has a locking position and a release position. When the locking means 120 is in the locking position thereof, the flip cover 110 is moved relative to the base 101 to the closed position, and the locking pin 122 can pass through the base 101, so as to be engaged with the locking hook 123 on the flip cover 110. When the locking means 120 is in the release position thereof, the flip cover 110 is released, the locking pin 122 disengages from the locking hook 123 on the flip cover 110, and the flip cover 110 can be driven by the hinge means 105 to move toward the open position thereof. In the embodiment of the present disclosure, the direction of movement of the locking means 120 coincides with the axial direction of the drive shaft 118.

The drive shaft 118 is located generally at the lower and front corner of the base 101. One side of the drive shaft is connected to the power source 150, and the other opposite side is provided with a fitting portion 113. The fitting portion 113 of the drive shaft 118 is configured to pass through the base 101 for connection to the hinge arm 115a on the front side. In this embodiment, the hinge arm 115a is installed on the fitting portion 113 of the drive shaft 118 by means of the receiving portion 116a thereof, such that the driving force of the power source 150 can be supplied to the hinge means 105 by means of the drive shaft 118. In some other embodiments, the fitting portion 113 of the drive shaft 118 may also be connected to the receiving portion of another hinge arm.

The drive member 108 is disposed on the the middle of the drive shaft 118, on the side close to the power source 150. With the rotation of the drive shaft 118, a drive portion 449 (see FIGS. 4A-4C) on the drive member 108 can contact a driven end 121 of the locking means 120 or disengage from the driven end 121 to enable the locking means 120 to move in the front and rear directions. Specific structures of the drive shaft 118 and the drive member 108 will be described in detail later with reference to FIGS. 4A-4C.

Figure 2A:
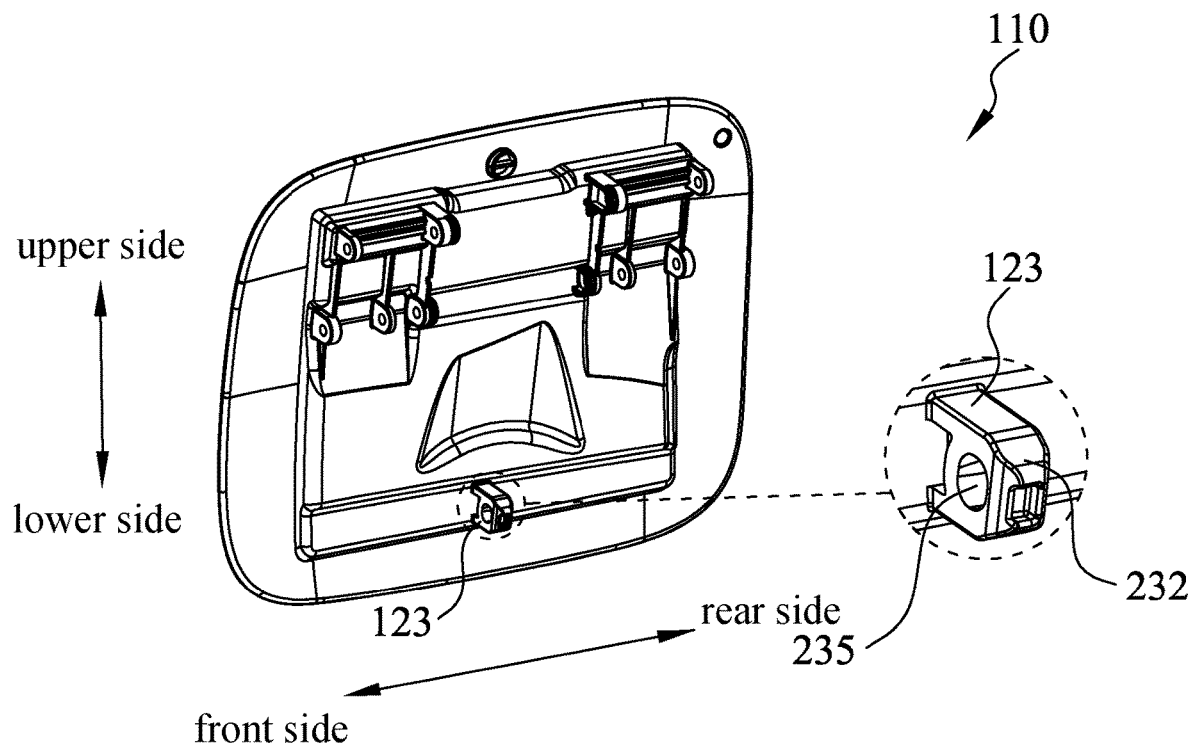
FIG. 2A is a perspective view of a flip cover in the flip cover assembly shown in FIG. 1B.
Figure 2B:
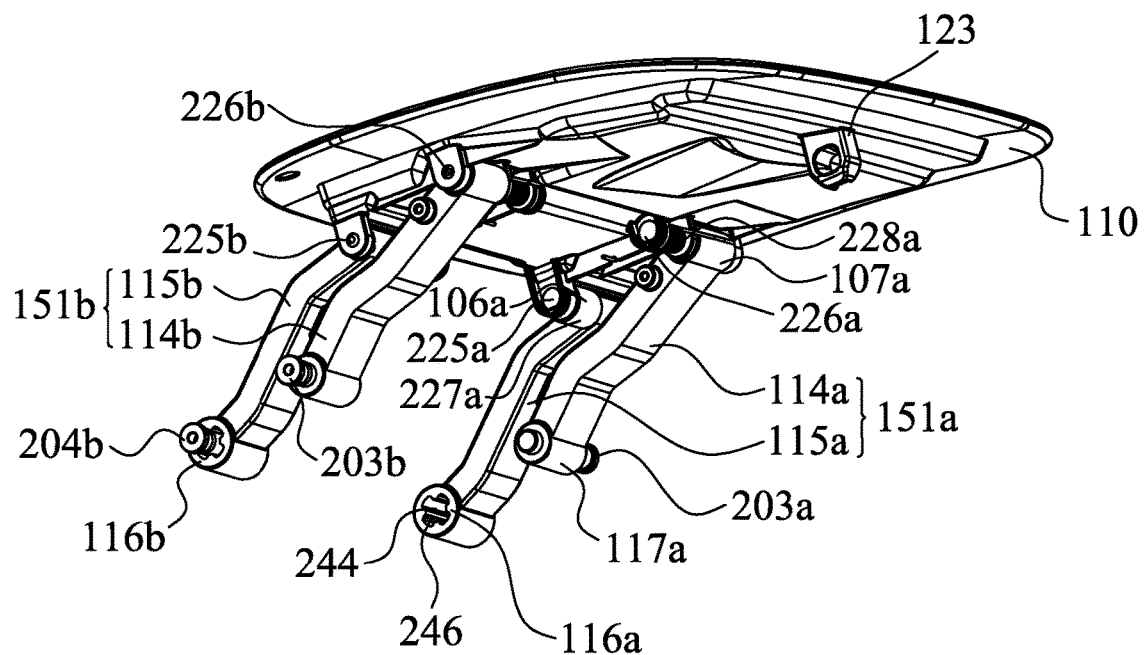
FIG. 2B is a perspective view of the flip cover and a hinge means in the flip cover assembly shown in FIG. 1B.

FIGS. 2A and 2B illustrate a specific structure of the flip cover 110, in which FIG. 2A illustrates a perspective view of the flip cover 110, and FIG. 2B shows a perspective view of the flip cover 110 and the hinge means 105, for illustrating the inner side of the flip cover 110, the structure of the hinge means 105 and the connection relationship of the flip cover 110 and the hinge means 105. As shown in FIG. 2A, the outer contour shape of the flip cover 110 substantially conforms with the outer contour of an inlet of the receiving cavity 167 of the base 101, in the middle of the lower side of the inner surface of the flip cover is provided with the locking hook 123, and the upper side of the inner surface thereof is configured to be connected to the connecting portions of each pair of hinge arms 151. The locking hook 123 extends inward from the inner surface of the flip cover 110, the locking hook 123 is provided with a locking hole 235, and the locking hole 235 extends through the locking hook 123 in the front and rear directions. Accordingly, the locking hole 235 can receive the locking pin 122 on the locking means 120 when the locking means 120 moves in the front and rear directions. The bottom of the locking hook 123 is provided with an inclined plane 232, and the inclined plane 232 is formed by extending obliquely downward from an upper surface of the locking hook 123.

Figure 3A:
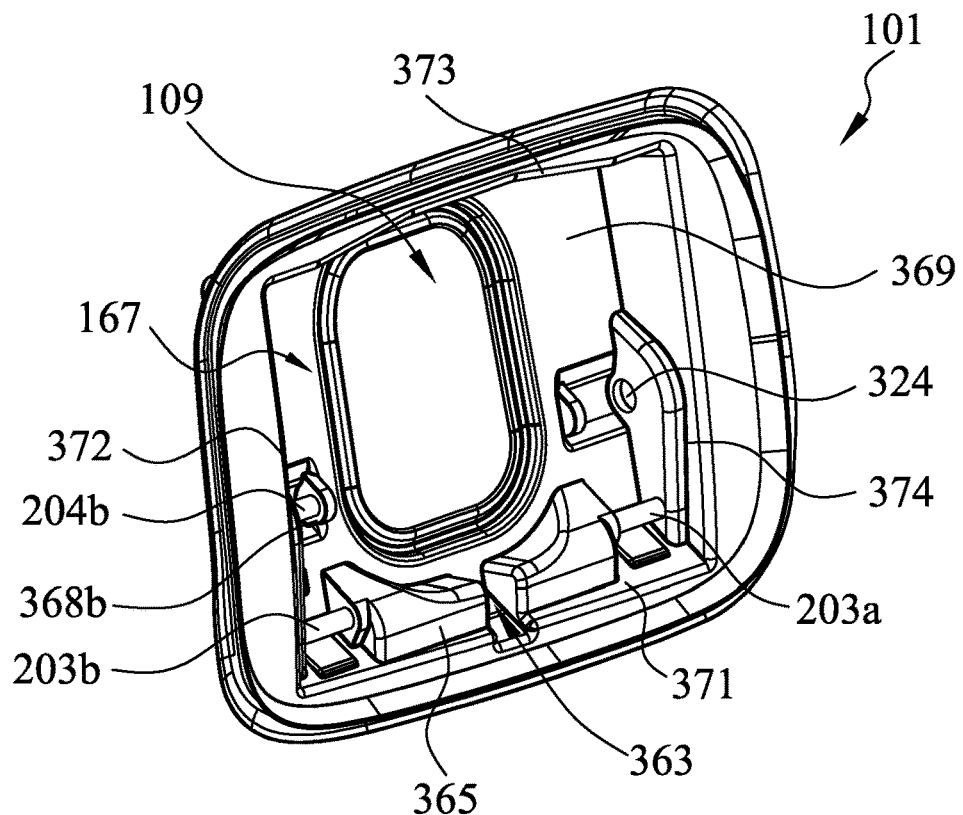
FIG. 3A is a perspective view, viewed from a perspective, of a base in the flip cover assembly shown in FIG. 1B.

As shown in FIG. 2B, in the first pair of hinge arms 151a, the hinge arm 114a is located on the lower side of the hinge arm 115a, the connecting portion 107a of the hinge arm 114a is hinged to the inner surface of the flip cover 110 by means of a shaft 226a, and the receiving portion 117a of the hinge arm 114a is hinged to the base 101 by means of a shaft 203a (see FIG. 3A). The connecting portion 106a of the hinge arm 115a is hinged to the inner surface of the flip cover 110 by means of a shaft 225a, and the shaft 225a is located on the upper side of the shaft 226a. The receiving portion 116a of the hinge arm 115a is internally provided with a shaft hole 244 extending in the front and rear directions, and the shaft hole 244 engages with the drive shaft 118 and is rotatably connected to the base 101 by means of the drive shaft 118. In the embodiment of the present disclosure, the receiving portion 116a is further provided with at least one protrusion receiving cavity 246 communicating with the shaft hole 244, and the protrusion receiving cavity 246 is formed by extending outward from a hole wall of the shaft hole 244 in a radial direction thereof. As a specific example, four protrusion receiving cavities 246 are uniformly formed in the circumferential direction of the shaft hole 244. The protrusion receiving cavities 246 cooperate with shaft drive protrusions 448 on the drive shaft 118 to form an engagement structure 440 (see FIGS. 4A-4C) such that the rotation of the drive shaft 118 can drive the rotation of the hinge arm 115a. The specific cooperative relationship of the engagement structure 440 will be described in detail later with reference to FIG. 4C.

The second pair of hinge arms 151b is structurally similar to the first pair of hinge arms 151a, and in the second pair of hinge arms 151b, the hinge arm 114b is located at the lower side of the hinge arm 115b. The respective connecting portions of the hinge arm 114b and the hinge arm 115b are hinged to the inner surface of the flip cover 110 by means of a shaft 226b and a shaft 225b. In addition, the receiving portion of the hinge arm 114b is hinged to the base 101 by means of a shaft 203b. Different from the first pair of hinge arms 151a, the receiving portion of the second pair of the hinge arm 115b is hinged to the base 101 by means of a shaft 204b.

In this embodiment, an elastic mechanism such as a torsion spring 228a is further disposed on the shaft 226a, and a damper 227a is further disposed on the shaft 225a. The flip cover 110 can be moved more smoothly by means of the elastic mechanism and the damper, and can be kept in the open position. Similarly, the shaft 226b and the shaft 225b are provided with elastic mechanisms and dampers (see FIG. 3C).

When the flip cover 110 is moved from the closed position to the open position, the drive shaft 118 first drives the receiving portion 117a of the hinge arm 115a to rotate downward about the axis of the drive shaft 118. Under the action of the damper 227a, the rotation of the hinge arm 115a can smoothly drive the flip cover 110 to move, and in turn drive the receiving portions of the other hinge arms to rotate downward about the respective axes. When the hinge arms 114a and 114b abut against an edge of the receiving cavity of the base 101, the respective hinge arms cannot continue to rotate so that the flip cover 110 reaches the open position.

When the flip cover 110 is moved from the open position to the closed position, similarly, the drive shaft 118 first drives the receiving portion of the hinge arm 115a to rotate upward about the axis of the drive shaft 118, and then drives the flip cover 110 to move by means of the rotation of the hinge arm 115a, so as to drive the other hinge arms to move upward. When the flip cover 110 covers an inlet edge of the receiving cavity 167 of the base 101, the flip cover 110 reaches the closed position, and the hinge arms cannot continue to rotate.

In this embodiment of the present disclosure, the drive shaft 118 is connected only to the hinge arm 115a, and therefore, only the hinge arm 115a is a driving arm and the other hinge arms are driven arms. When the hinge arm 115a is driven by the drive shaft 118 to rotate, the flip cover 110 is driven to move, and then the other hinge arms are driven to rotate by means of the movement of the flip cover 110. As an example, the shaft 203a, the shaft 203b and the shaft 204b are all fixedly connected to the base 101, and the corresponding hinge arm is rotatable about the axis of the respective shaft relative to the shaft at one end of the receiving portion thereof. The shaft 225a, the shaft 226a, the shaft 225b, and the shaft 226b are all rotatably connected to the flip cover 110, such that the corresponding hinge arm can rotate about the axis of the respective shaft relative to the shaft at one end of the connecting portion thereof, and these shafts can also rotate relative to the flip cover 110. However, under the action of the torsion springs and the dampers, the rotation of these shafts relative to the flip cover 110 may be limited. In other examples, these shafts may also be fixedly connected to the respective hinge arms rather than to the base 101, and therefore, the hinge arms can be rotated together with the respective shafts about the axes of the shafts.

Figure 3B:
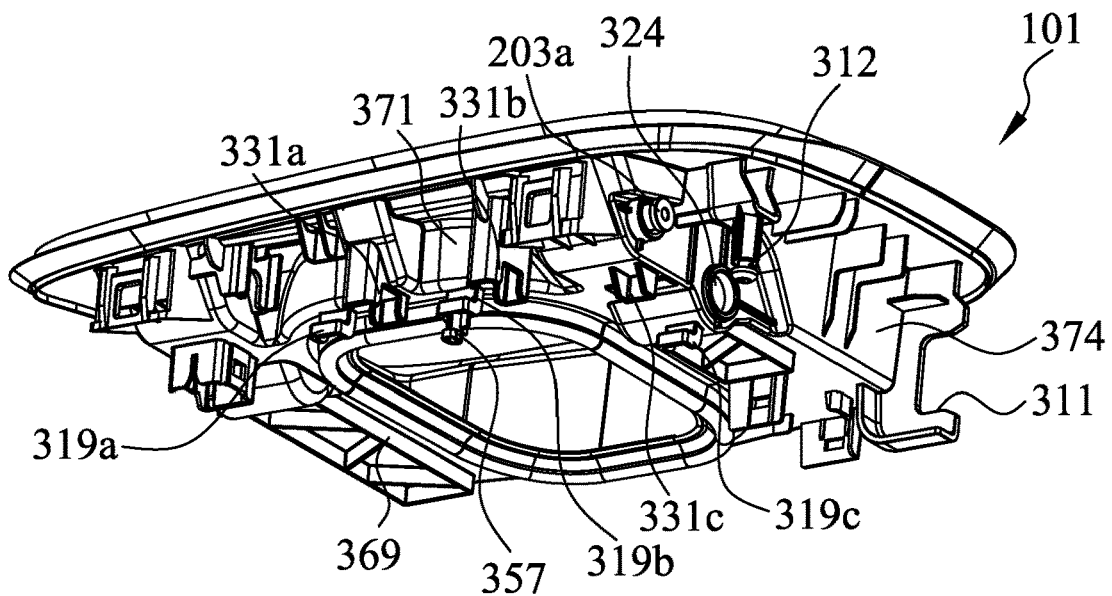
FIG. 3B is a perspective view, viewed from another perspective, of the base in the flip cover assembly shown in FIG. 1B.
Figure 3C:
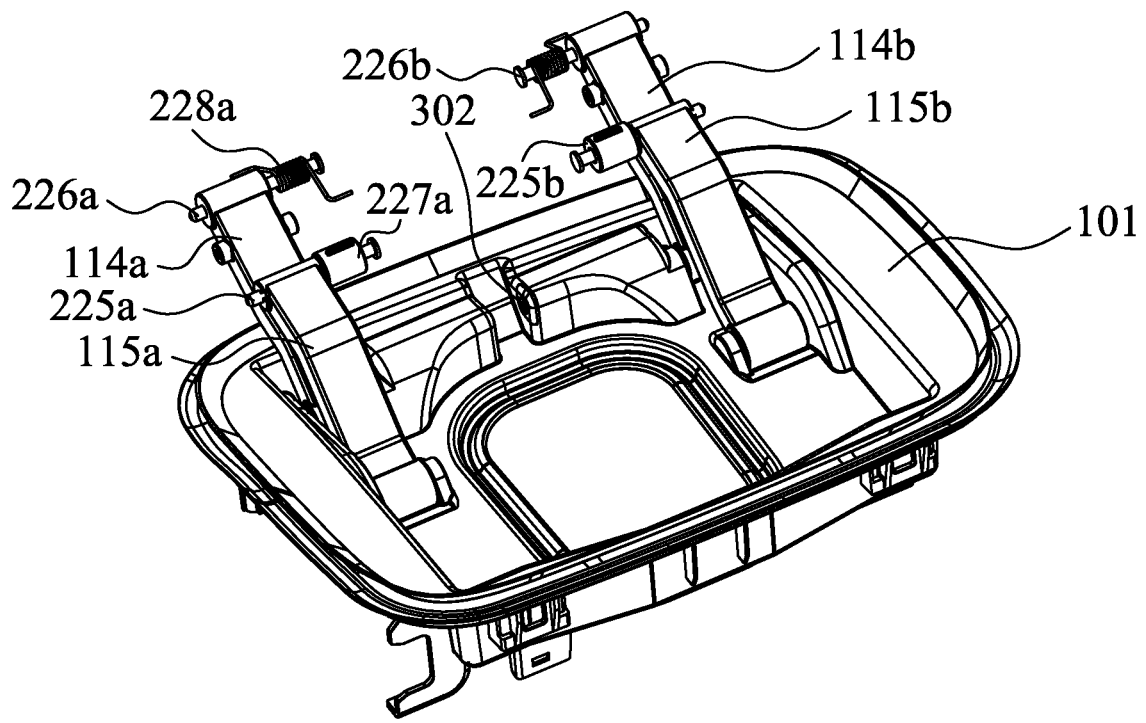
FIG. 3C is a perspective view of the base and the hinge means in the flip cover assembly shown in FIG. 1B.

FIGS. 3A-3C illustrate a specific structure of the base 101, in which FIG. 3A illustrates the structure of the base 101 from the perspective shown in FIG. 1B for showing components within the receiving cavity 167 of the base 101, FIG. 3B illustrates the structure outside the receiving cavity 167 of the base 101, and FIG. 3C illustrates a structure in which the hinge means 105 is connected to the base 101 for showing the connection relationship between the hinge means 105 and the base 101 and the position of the locking hole 302. As shown in FIGS. 3A-3C, the base 101 is generally in the shape of a box, the receiving cavity 167 is formed therein, and the refueling port or the charging port 109 is formed at the bottom 369 of the base 101 and communicates with the receiving cavity 167. The base 101 is configured to be mounted on the vehicle body, with the receiving cavity 167 facing the outside of the vehicle. Accordingly, when the receiving cavity 167 is opened, the refueling port or the charging port 109 can be exposed.

As shown in FIG. 3A, at lower side wall 371 in the receiving cavity 167 of the base 101, two limiting protrusions 365 are formed by protruding into the receiving cavity 167, and the two limiting protrusions 365 are spaced apart to form a receiving groove 363 for receiving the locking hook 123 on the flip cover 110. At least the limiting protrusion 365 on the rear side is further provided with the locking hole 302, the locking hole 302 passes through the corresponding limiting protrusion 365 in the front and rear directions and penetrates the base 101, such that the locking pin 122 of the locking means 120 connected to the outside of the base 101 passes through the locking hole. When the flip cover 110 is in the closed position, the locking hole 302 in the base 101 is aligned with the locking hole 235 in the flip cover 110 so that the locking pin 122 of the locking means 120 can be inserted into the locking hole 235 through the locking hole 302 to lock the flip cover 110 in the closed position. As will be appreciated by those skilled in the art, the limiting protrusion 365 on the front side may also be provided with a locking hole 302 at a corresponding location.

As shown in FIGS. 3A and 3C, the first pair of hinge arms 151a and the second pair of hinge arms 151b are respectively hinged to the front and rear sides of the interior of the receiving cavity 167 of the base 101. In the embodiment shown in the figures, the shaft 203a for the first pair of hinge arms 151a and the shaft 203b for the second pair of hinge arms 151b are disposed at the lower side in the receiving cavity 167, and one end of each of the shaft 203a and the shaft 203b is connected to a front side wall 374 or a rear side wall 372 of the base 101, and the other end thereof is connected to the limiting protrusion 365 near the corresponding side. Accordingly, the hinge arm 114a and the hinge arm 114b are rotatably connected (i.e., hinged) to the base 101. The shaft 204b is connected at the position lower than the shaft 203b, and has one end connected to the rear side wall 372 and the other end connected to a support block 368b which is disposed on the bottom 369 of the base 101, so as to rotatably connect (i.e., hinge) the hinge arm 115b to the base 101. Symmetrically, a support block 368a is also disposed on the front side of the receiving cavity 167, and the drive shaft 118 can pass through the front side wall 374 from the outer side of the base 101, so as to be rotatably connected to the support block 368a. Accordingly, the hinge arm 115a can also be rotatably connected to the base 101.

As shown in FIG. 3B, an electric motor retaining groove 311 is provided outside the front side wall 374 of the base 101, the upper side of the power source 150 is retained in the electric motor retaining groove 311, and the lower side thereof is fastened to the base 101 by means of a fastener 312, and thus the power source 150 can be fixed to the front side of the base 101. A shaft hole 324 is further provided in the front side wall 374. One end of the drive shaft 118 can be connected to the power source 150, and the other end thereof can pass through the front side wall 374 of the base 101 from the shaft hole 324 and enter the receiving cavity 167, so as to be connected to the hinge arm 115a to transfer the driving force of the power source 150 to the hinge arm 115a.

The lower side wall 371 and the bottom 369 of the base 101 are provided with L-shaped grooves 319a, 319b and 319c and limiting blocks 331a, 331b and 331c for engaging with the locking means 120, such that the locking means 120 can be movably connected to the base 101. In this embodiment, the L-shaped grooves 319a, 319b, and 319c can limit the movement of the locking means 120 toward the upper side or the inner side, and the limiting blocks 331a, 331b and 331c can limit the movement of the locking means 120 toward the lower side or the outer side. Accordingly, the locking means 120 is connected to the lower side of the base 101 and can only move in the front and rear directions. As an example, a fixing column 357 is further provided on the inner side of the L-shaped groove 319b, and the fixing column 357 is configured to be connected to one end of a spring 538 (see FIG. 5B) in the locking means 120.

Figure 4A:
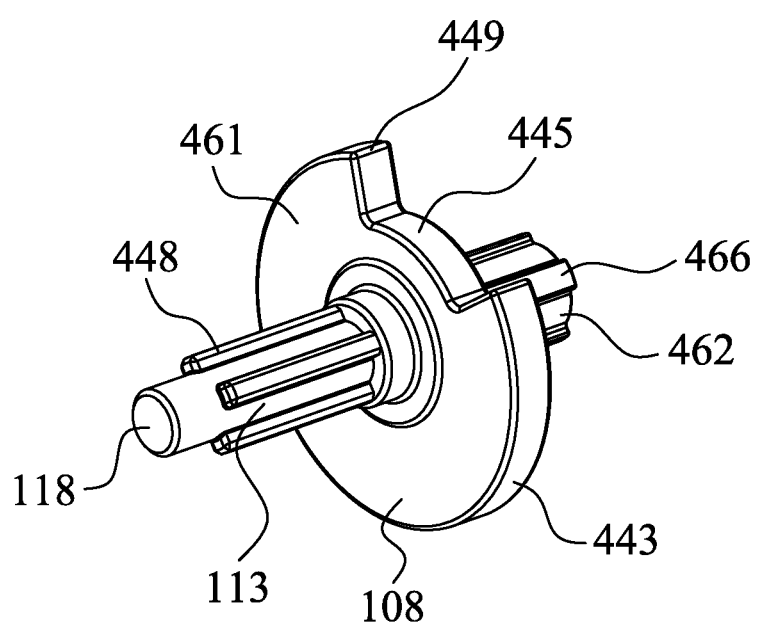
FIG. 4A is a perspective view of a drive shaft and a drive member in the flip cover assembly shown in FIG. 1B.
Figure 4B:
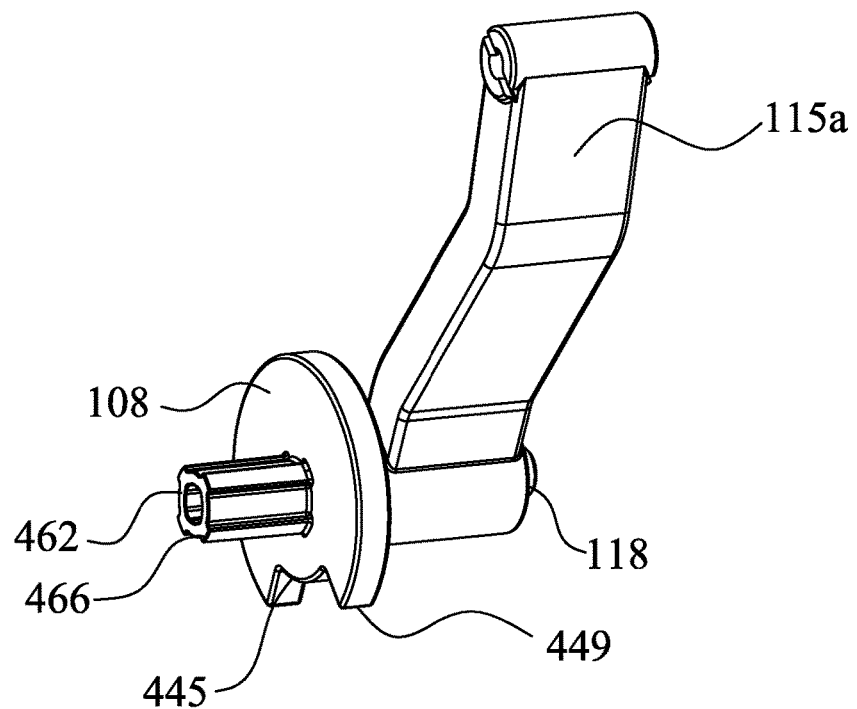
FIG. 4B is a perspective view of the drive shaft, the drive member and a hinge arm in the flip cover assembly shown in FIG. 1C.
Figure 4C:
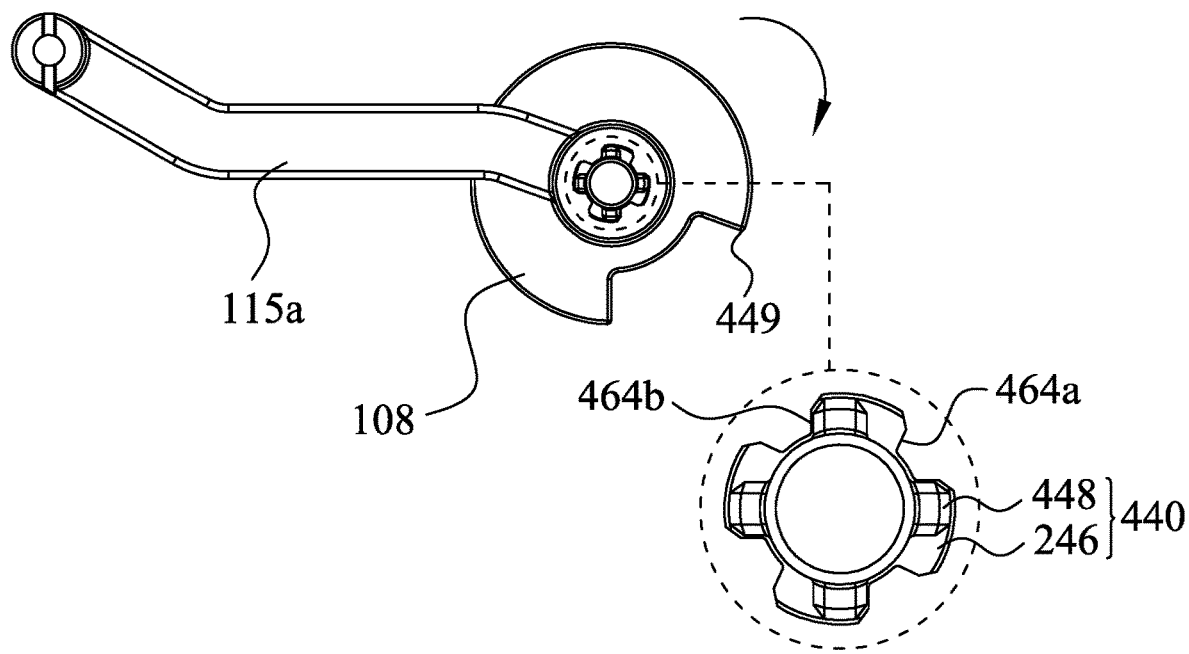
FIG. 4C is a right view of FIG. 4B.

FIGS. 4A-4C illustrate specific structures of the drive shaft 118 and the drive member 108, in which FIG. 4A is a structural perspective view of the drive shaft 118 and the drive member 108 from the perspective shown in FIG. 1B, for illustrating the structure of the drive shaft 118; and FIGS. 4B and 4C illustrate the connection relationship of the drive shaft 118, the drive member 108, and the hinge arm 115a. FIG. 4B illustrates the specific structure of the drive member 108, and FIG. 4C illustrates a cooperative structure of the drive shaft 118 and the hinge arm 115a.

As shown in FIG. 4A, the drive shaft 118 is generally in the shape of a long column, and the drive member 108 is disposed on the drive shaft 118 coaxially, the axial directions of the drive member and the drive shaft are coinciding with the front and rear directions. The drive shaft 118 has a connecting portion 462 and a fitting portion 113, the connecting portion 462 and the fitting portion 113 are respectively disposed on two sides of the drive member 108, the connecting portion 462 is configured to be connected to the power source 150, and the fitting portion 113 is configured to be connected to the hinge arm 115a. As an example, the connecting portion 462 is provided with at least one protrusion 466. In this embodiment, four protrusions 466 are provided. The connecting portion 462 is connected to the power source 150 by means of the protrusions 466 to receive the driving force of the power source 150, such that the drive shaft 118 can be rotated. Moreover, the fitting portion 113 is provided with at least one shaft drive protrusion 448. In this embodiment, the number of the shaft drive protrusions 448 is the same as that of the protrusion receiving cavities 246 of the receiving portion 116a of the hinge arm 115a, and four shaft drive protrusions and four protrusion receiving cavities are provided and are uniformly disposed in the circumferential direction of the fitting portion 113. The fitting portion 113 of the drive shaft 118 is connected to the receiving portion 116a of the hinge arm 115a by means of the shaft drive protrusion 448. When the fitting portion 113 of the drive shaft 118 is inserted into the receiving portion 116a of the hinge arm 115a, the fitting portion 113 is received in the shaft hole 244, and the shaft drive protrusion 448 is received in a corresponding protrusion receiving cavity 246.

As shown in FIGS. 4A and 4C, the shaft drive protrusion 448 and the corresponding protrusion receiving cavity 246 form an engagement structure 440, and in each engagement structure 440, the circumferential dimension of the protrusion receiving cavity 246 is larger than that of the shaft drive protrusion 448 such that the receiving portion 116a and the fitting portion 113 can be rotatably engaged or rotatably separated. When the receiving portion 116a and the fitting portion 113 are rotatably separated, the drive shaft 118 rotates relative to the hinge arm 115a without driving the hinge arm 115a to rotate. When the receiving portion 116a and the fitting portion 113 are rotatably engaged, the drive shaft 118 can drive the hinge arm 115a to rotate, and in turn drive the hinge means 105 to rotate to open the flip cover 110.

Specifically, the protrusion receiving cavity 246 has limiting walls 464a and 464b in the circumferential direction. In the state shown in FIG. 4C, the shaft drive protrusion 448 abuts against the limiting wall 464b and is spaced apart from the limiting wall 464a by a certain distance. If the shaft drive protrusion 448 rotates clockwise toward the limiting wall 464a in the direction shown by the arrow, the protrusion receiving cavity 246 is separated from the shaft drive protrusion 448 in the rotation direction, that is, the receiving portion 116a and the fitting portion 113 are rotatably separated, and at this moment, the drive shaft 118 does not drive the hinge arm 115a to rotate, but rotates relative to the hinge arm 115a. When the shaft drive protrusion 448 continues to rotate clockwise after rotating to abut against the limiting wall 464a, the protrusion receiving cavity 246 is engaged with the shaft drive protrusion 448 in the rotation direction, i.e., the receiving portion 116a and the fitting portion 113 are rotatably engaged, and at this moment, the drive shaft 118 drives the hinge arm 115a to rotate.

Those skilled in the art may design the circumferential dimension of the protrusion receiving cavity 246 and the circumferential dimension of the shaft drive protrusion 448 according to angle range required for the rotatable engagement or rotatable separation of the fitting portion of the drive shaft 118 and the receiving portion 116a of the hinge means 105.

Accordingly, in this embodiment, by providing such an engagement structure 440, the drive shaft 118 not driving or driving the hinge arm 115a to rotate can be achieved only by means of rotation of the drive shaft 118 in different angle ranges.

As shown in FIGS. 4A and 4B, the drive member 108 is in the shape of a disk having a notch 445 and is integrally formed with the drive shaft 118, such that the drive member 108 and the drive shaft 118 can rotate synchronously. The notch 445 is formed by being recessed inward in the radial direction from a circumferential surface 443 of the drive member 108. The notch 445 forms two bent corners on the circumferential surface 443 of the drive member 108. One of the two bent corners forms a drive portion 449. The drive portion 449 is configured to contact the driven end 121 of the locking means 120 such that the drive portion 449 can drive the locking means 120 to move with rotation of the drive member 108 (see FIG. 6B).

Figure 5A:
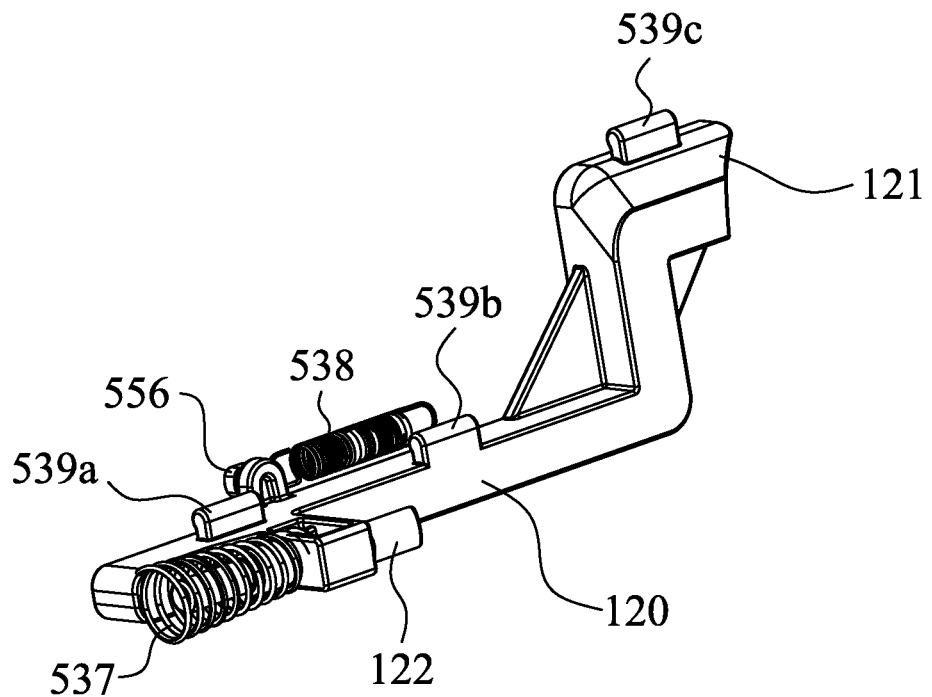
FIG. 5A is a perspective view, viewed from an perspective, of a locking means in the flip cover assembly shown in FIG. 1B.
Figure 5B:
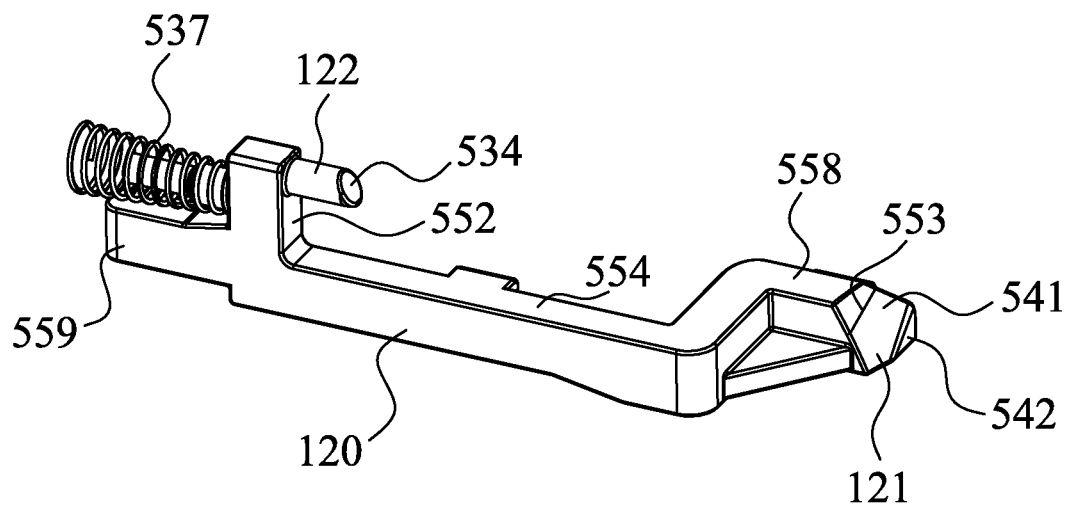
FIG. 5B is a perspective view, viewed from another perspective, of the locking means shown in FIG. 5A.
Figure 5C:
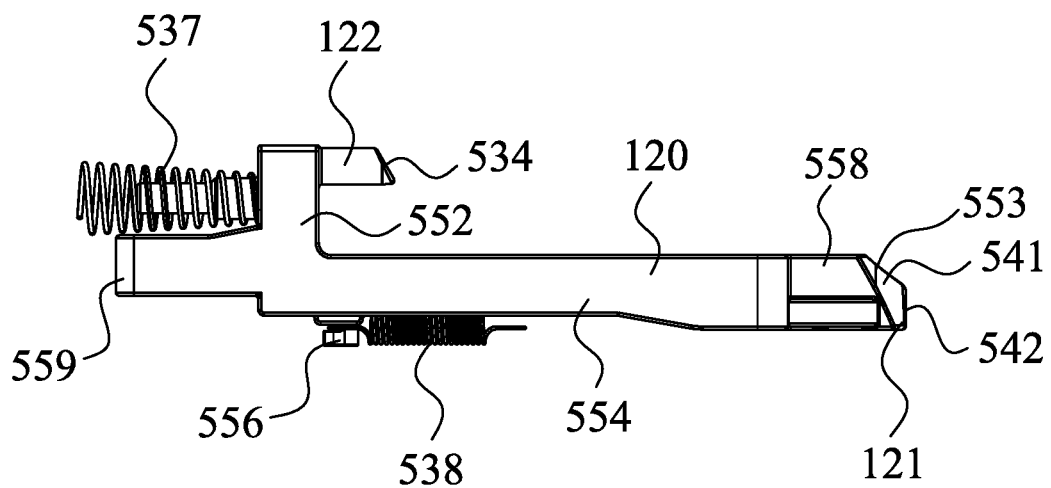
FIG. 5C is a front view of FIG. 5B.
Figure 5D:
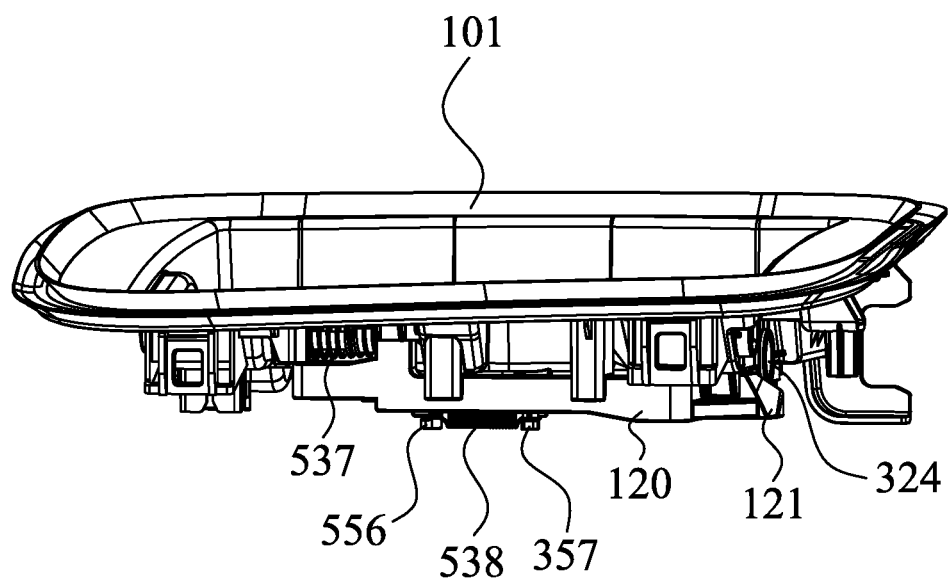
FIG. 5D is a perspective view of the base and the locking means in the flip cover assembly shown in FIG. 1C.

FIGS. 5A-5D illustrate a specific structure of the locking means 120, in which FIG. 5A illustrates a structural perspective view of the locking means 120 from the perspective shown in FIG. 1B, FIG. 5B illustrates a structural perspective view of the locking means 120 from the perspective from the lower side to the upper side, FIG. 5C illustrates a front view of FIG. 5B, and FIG. 5D illustrates a structural perspective view of the locking means 120 mounted on the base 101. As shown in FIGS. 5A-5C, the locking means 120 is an elongated locking rod having a head portion 558, a body 554, and a tail portion 559 in a lengthwise direction thereof. The head portion 558 is formed by bending one end of the front side of the locking rod toward the upper side and then toward the front side, and the head portion 558 is connected substantially parallel to the body 554 of the locking rod. The tail portion 559 is formed by extending backward from one end of the rear side of the locking rod. Such a shape enables the head portion 558 to protrude toward the upper side from the front side of the base 101 to contact the drive member 108 on the drive shaft 118 although the locking means 120 is disposed on the lower side and outside of the base 101.

The driven end 121 of the locking means 120 is disposed at the head portion 558, and the driven end 121 has a driven inclined plane 541. In this embodiment, the driven inclined plane 541 is inclined both toward the front side and toward the lower side in the direction from the outer side to the inner side. An engagement surface 542 perpendicular to the lengthwise direction of the locking means 120 is further provided at an end of the driven inclined plane 541. The driven inclined plane 541 is configured to contact the drive portion 449 of the drive member 108 and to be driven by the drive portion 449. In some embodiments, the driven inclined plane 541 may also be inclined in other ways, such as only toward the front side, provided that it can ensure that when the drive portion 449 drives the driven inclined plane 541, a component of force toward the rear side can be generated on the driven inclined plane 541. The driven inclined plane 541 is further provided with a recess 553, and the recess 553 is configured to keep the position of the drive portion 449.

A top surface of the locking rod body 554 near the rear side is provided a pillar 552, and the pillar 552 extends in a direction perpendicular to the lengthwise direction of the locking means 120. The locking pin 122 is connected to the pillar 552, generally parallel to the locking rod body 554. Accordingly, when the locking means 120 moves in the front and rear directions, the locking pin 122 can also be moved forward into the locking hole 235 of the flip cover 110 or backward out of the locking hole 235. The front end of the locking pin 122 has an oblique inclined plane 534, and the inclined plane 534 cooperates with the inclined plane 232 on the locking hook 123. When the hinge means 105 drives the flip cover 110 to close, in a state where the flip cover 110 approaches the base 101 but not completely closed, the inclined plane 534 of the locking pin 122 contacts the inclined plane 232 of the locking hook 123, and then the locking pin 122 and the locking hook 123 slide relatively along the inclined planes, such that the locking pin 122 is inserted into the locking hole 235 in the locking hook 123, and the flip cover 110 is completely closed. Accordingly, the closing and locking of the flip cover 110 can be occured almost synchronously.

The flip cover actuation assembly 180 further comprises a return spring 537 and a return spring 538, they are both connected between the locking means 120 and the base 101. In this embodiment, the return spring 537 and the return spring 538 are both provided, and those skilled in the art will appreciate that in other embodiments, only one of the return spring 537 and the return spring 538 may be provided. The return spring 537 is disposed on the outer side of the tail portion 559 of the locking means 120, and has a front end abutting against the pillar 552, and a rear end configured to abut against the base 101. The return spring 538 is disposed at the bottom of the locking rod body 554 of the locking means 120, a fixing column 556 is connected to the locking rod body 554, the rear end of the return spring 538 is connected to the fixing column 556, and the front end of the return spring is connected to the fixing column 357 on the base 101. Since the base 101 is fixed to the vehicle body, the return spring 537 and the return spring 538 can provide elastic forces to the locking means 120.

As shown in FIG. 5A, the upper side of the locking means 120 is provided with raised blocks 539a, 539b and 539c for cooperating with the L-shaped grooves 319a, 319b and 319c and the limiting blocks 331a, 331b and 331c on the base 101 to movably retain the locking means 120 on the base 101.

As shown in FIG. 5D, when the locking means 120 is connected to the base 101, the locking means 120 is disposed on the lower side of the base 101 and can be moved in the front and rear directions. The head portion 558 of the locking means 120 extends out toward the upper side from the front side of the base 101 such that the driven end 121 approaches the shaft hole 324 in the base 101. When the drive shaft 118 extends from the shaft hole 324 into the base 101, the driven end 121 can contact the drive member 108 on the drive shaft 118.

When the locking means 120 is in the locking position, the driven end 121 of the locking means 120 can be received in the notch 445 of the drive member 108, and the drive portion 449 of the drive member 108 can contact the driven inclined plane 541. With rotation of the drive member 108, the locking means 120 moves toward its release position, the drive portion 449 drives the locking means 120 to move toward the rear side, and the return spring 537 and the return spring 538 are compressed. When the locking means 120 moves toward the rear side to the extent that the driven end 121 is released from the notch 445, the locking means 120 reaches its release position, and the engagement surface 542 abuts against a radial surface 461 of the drive member 108 under the action of return forces of the return spring 537 and the return spring 538.

When the drive member 108 reversely rotates to the extent that the notch 445 is exposed to the driven end 121 of the locking means 120, the locking means 120 moves toward the front side under the action of the return forces of the return spring 537 and the return spring 538 until reaching its locking position. The drive portion 449 of the drive member 108 moves along the driven inclined plane 541 to the recess 553.

Accordingly, during the opening of the flip cover 110, the locking means 120 is first moved to the release position, the hinge means 105 then opens the flip cover 110, and the locking means 120 does not affect the opening of the flip cover 110 during the opening of the flip cover 110. Therefore, for the locking means 120, the function of releasing the flip cover 110 and the function of opening the flip cover 110 are achieved in different time, these two functions will not interfere with each other. During closing of the flip cover 110, the locking means 120 moves toward the locking position, to synchronously complete the closing and locking of the flip cover 110.

In the embodiment of the present disclosure, a pull cord (not shown in figures) may also be connected to the locking means 120, and the pull cord extends into the interior of the vehicle for an operator to pull toward the rear side. In the case where the power source 150 fails and the flip cover assembly 100 is closed and locked, the operator can manually pull the locking means 120 from the interior of the vehicle to the release position, so that the flip cover 110 can be released to open the refueling port or the charging port 109.

Figure 6A:
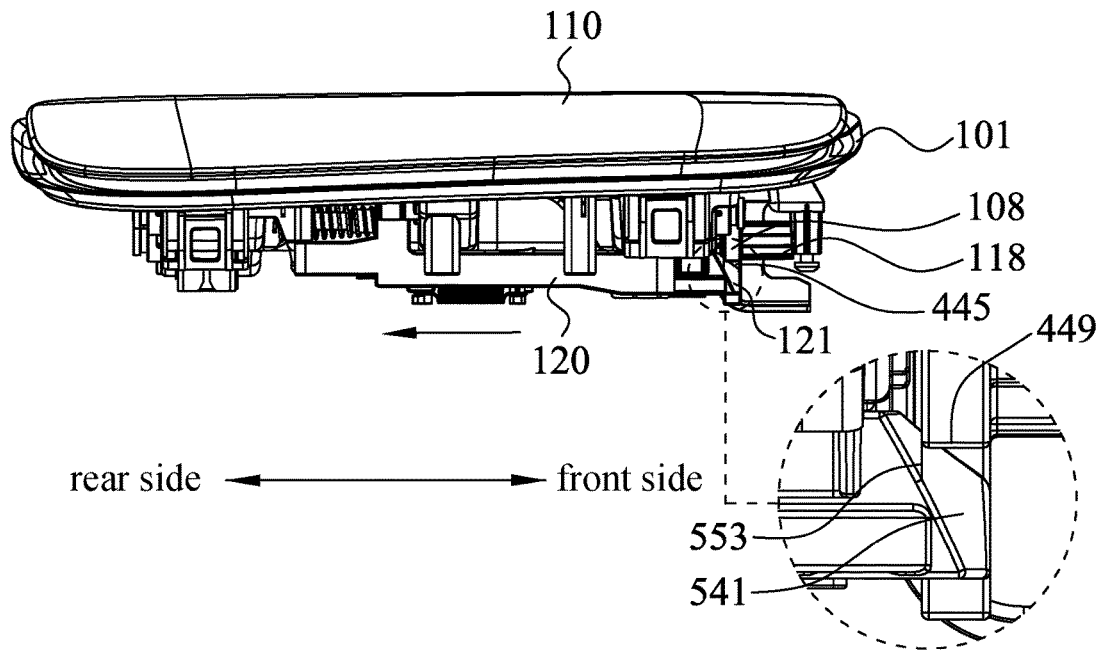
FIG. 6A is a front view of the flip cover assembly 100 when the flip cover assembly is in the closed state and a locking state.
Figure 6B:
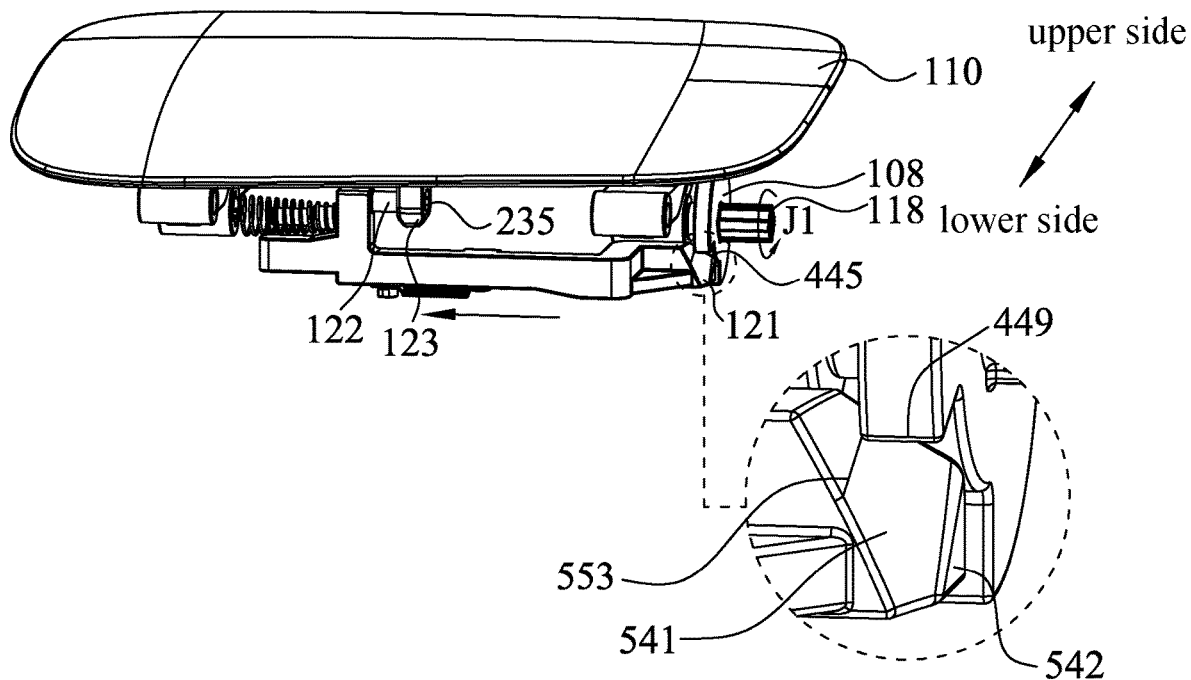
FIG. 6B is a perspective view of the flip cover assembly 100 in FIG. 6A with the base and a power source removed.
Figure 6C:
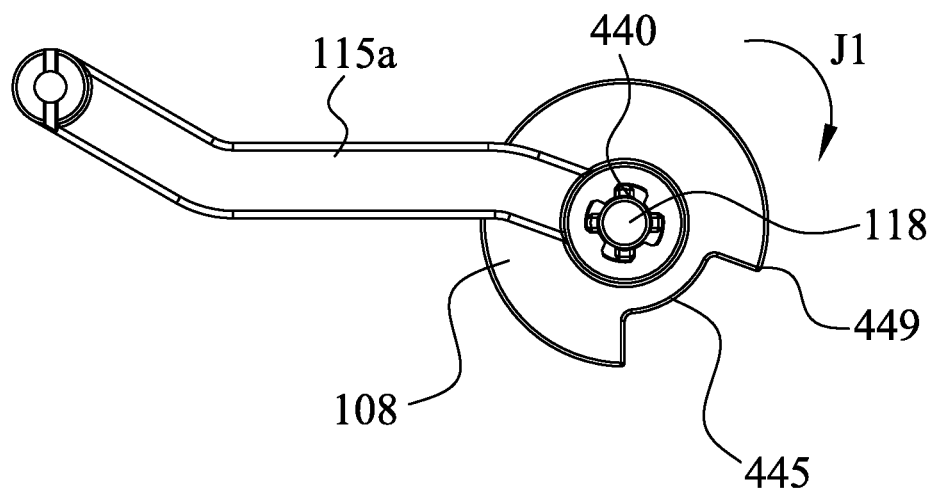
FIG. 6C is a diagram showing the cooperative relationship of the drive shaft, the drive member and the hinge arm in FIG. 6B.
Figure 6D:
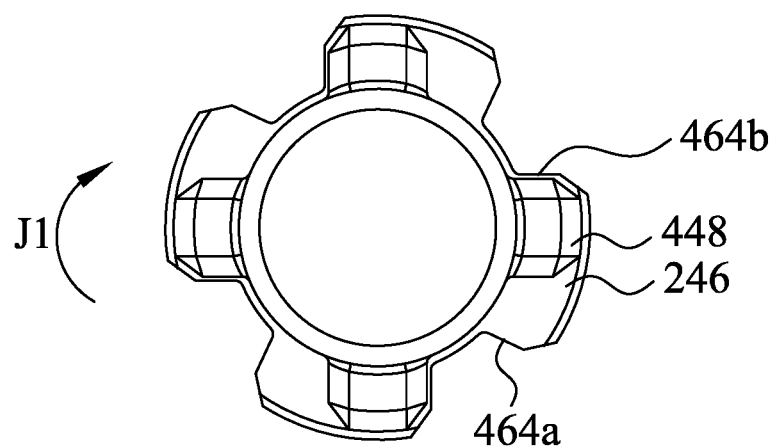
FIG. 6D is an enlarged view of an engagement structure in FIG. 6C.

FIGS. 6A-6D illustrate the specific structure of the flip cover assembly 100 when the flip cover assembly 100 is in the closed state and the locking means 120 is in the locking position. FIG. 6A shows a front view of the flip cover assembly 100, for illustrating the position of the flip cover 110; FIG. 6B is a perspective view of the flip cover assembly 100 in FIG. 6A, with the base 101 and the power source 150 removed, for illustrating the relative position between the locking means 120 and the drive member 108; FIG. 6C is a diagram showing the cooperative relationship of the drive shaft 118, the drive member 108 and the hinge arm 115a in FIG. 6B, for illustrating rotation angles of the drive member 108 and the hinge arm 115a; and FIG. 6D is an enlarged view of the engagement structure 440 in FIG. 6C.

As shown in FIGS. 6A-6D, the flip cover 110 is in its closed position and covers the base 101 to close the refueling port or the charging port 109. The locking hook 123 of the flip cover 110 is inserted into the receiving groove 363 of the base 101. The locking means 120 is in its locking position, and the locking pin 122 is inserted into the locking hole 235 in the locking hook 123 of the flip cover 110 through the locking hole 302 in the base 101, so as to lock the flip cover 110 in its closed position. The notch 445 of the locking member 108 receives the driven end 121 of the locking means 120. At this moment, the return spring 537 and the return spring 538 are in a compressed state, and the drive portion 449 of the drive member 108 abuts against and is retained at the recess 553 of the driven end 121 under the action of the elastic forces.

In the state as shown in FIGS. 6A-6D, the fitting portion 113 of the drive shaft 118 is inserted into the receiving portion 116a of the hinge arm 115a of the hinge means 105, and the shaft drive protrusion 448 in the engagement structure 440 abuts against the limiting wall 464b of the protrusion receiving cavity 246 and is spaced apart from the limiting wall 464a by a distance.

When the drive shaft 118 rotates in a direction of J1 toward the limiting wall 464a (i.e., clockwise rotation in FIGS. 6C and 6D), simultaneous rotation of the drive member 108 causes the drive portion 449 to move from the recess 553 of the locking means 120 along the driven inclined plane 541, so as to drive the locking means 120 to move away from the drive member 108 toward the rear side, such that the locking pin 122 on the locking means 120 is released from the locking hole 235 in the locking hook 123, thereby releasing the flip cover 110 and simultaneously compressing the return spring 537 and the return spring 538 on the locking means 120. However, the shaft drive protrusion 448 is separated from the upstream (in the rotation direction) limiting wall 464a of the protrusion receiving cavity 246 such that the drive shaft 118 rotates relative to the hinge arm 115a without driving the hinge arm 115a to rotate. This condition will continue until the shaft drive protrusion 448 rotates in the protrusion receiving cavity 246 to the position as shown in FIGS. 7A-7D.

Figure 7A:
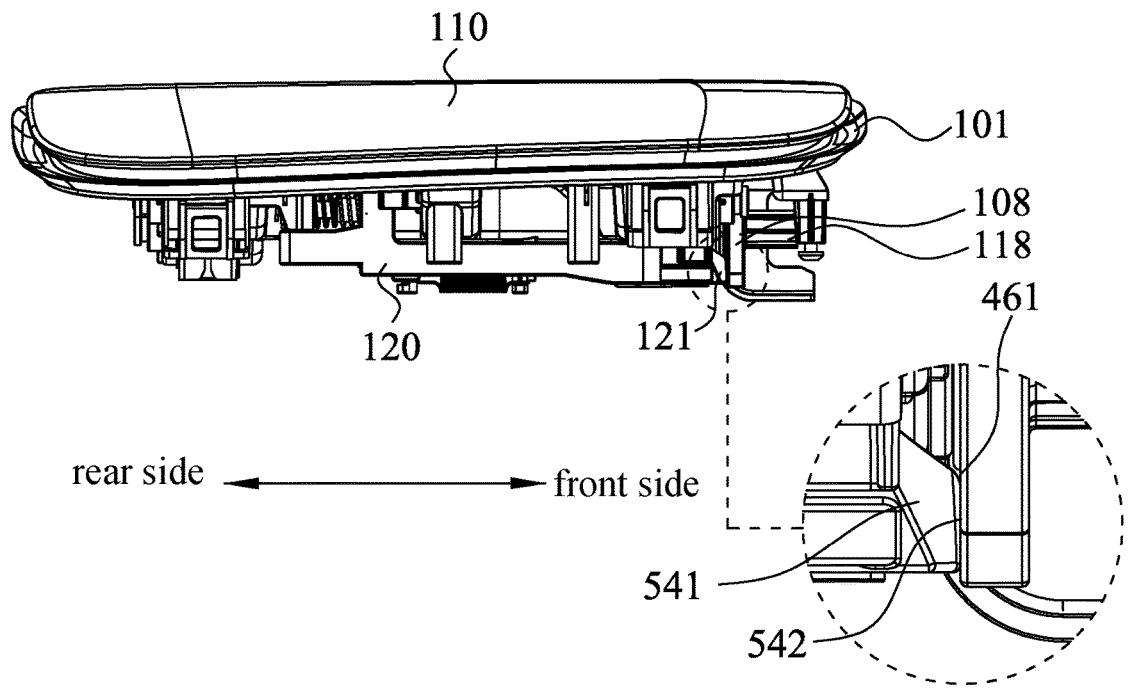
FIG. 7A is a front view of the flip cover assembly 100 when the flip cover assembly in the closed state and a release state.
Figure 7B:
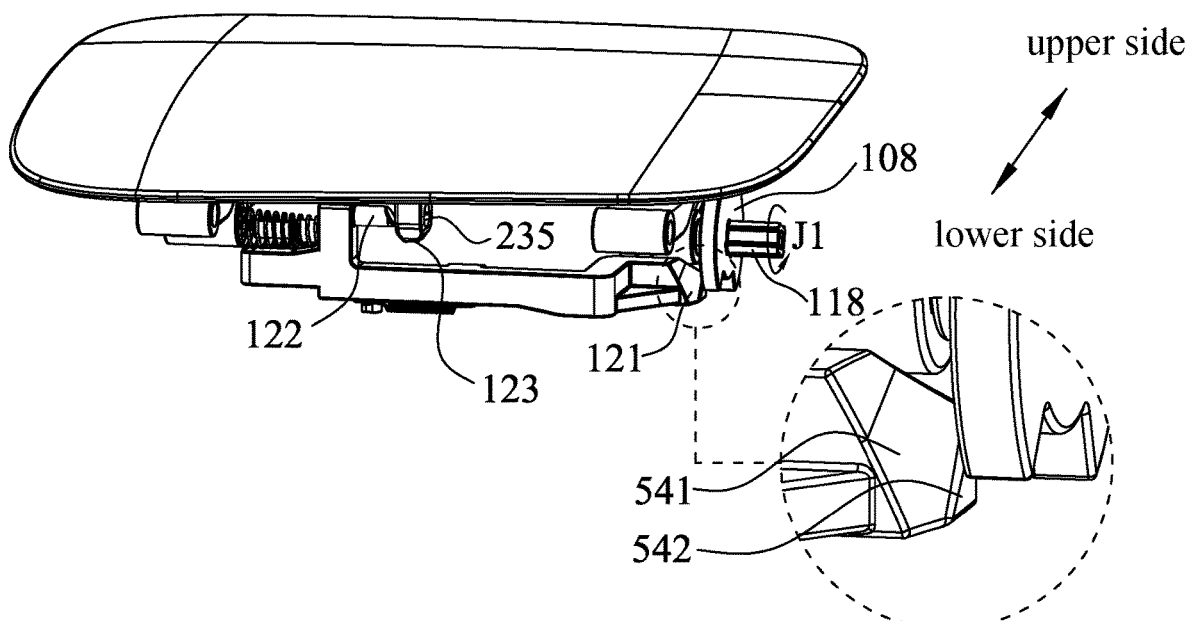
FIG. 7B is a perspective view of the flip cover assembly 100 in FIG. 7A with the base and a power source removed.
Figure 7C:
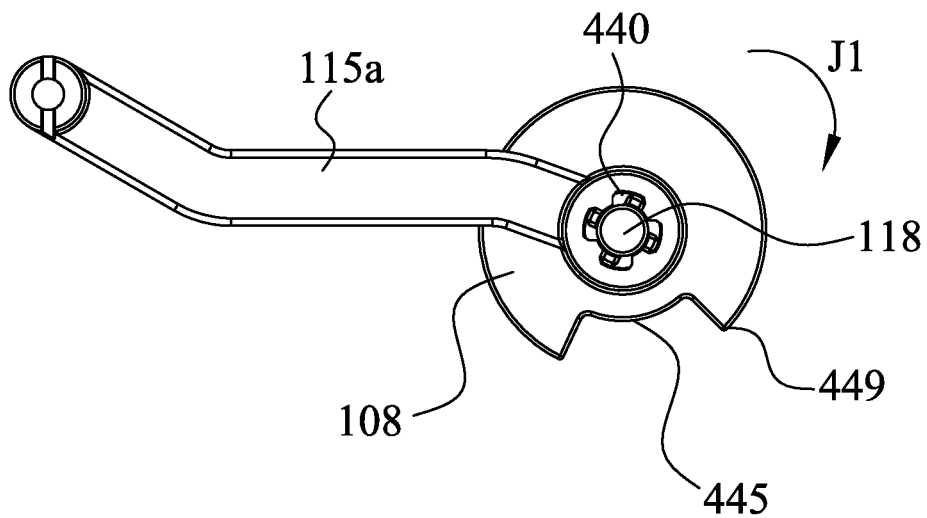
FIG. 7C is a diagram showing the cooperative relationship of the drive shaft, the drive member and the hinge arm in FIG. 7B.
Figure 7D:
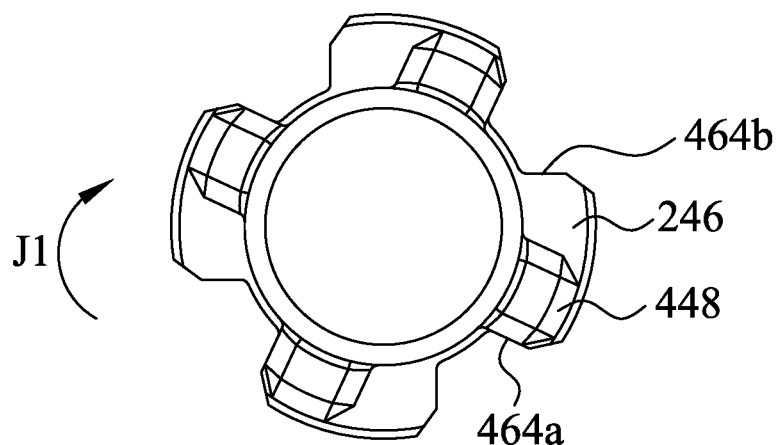
FIG. 7D is an enlarged view of the engagement structure in FIG. 7C.

FIGS. 7A-7D illustrate the specific structure of the flip cover assembly 100 when the flip cover assembly 100 is in the closed state but the locking means 120 is in the release position. FIG. 7A shows a front view of the flip cover assembly 100, for illustrating the position of the flip cover 110; FIG. 7B is a perspective view of the flip cover assembly 100 in FIG. 7A, with the base 101 and the power source 150 removed, for illustrating the relative position between the locking means 120 and the drive member 108; FIG. 7C is a diagram showing the cooperative relationship of the drive shaft 118, the drive member 108 and the hinge arm 115a in FIG. 7B, for illustrating rotation angles of the drive member 108 and the hinge arm 115a; and FIG. 7D is an enlarged view of the engagement structure 440 in FIG. 7C.

As shown in FIGS. 7A-7D, the flip cover 110 is still in its closed position and covers the base 101 to close the refueling port or the charging port 109. The locking hook 123 of the flip cover 110 is still inserted into the receiving groove 363 of the base 101. However, the locking means 120 is in its release position, the locking pin 122 is withdrawn from the locking hole 302 in the base 101 and the locking hole 235 in the locking hook 123 of the flip cover 110, so as to release the flip cover 110. The drive portion 449 of the drive member 108 disengages from the driven inclined plane 541 of the locking means 120, the driven end 121 of the locking means 120 is disengaged from the notch 445 of the drive member 108, the engagement surface 542 at the end of the driven inclined plane 541 abuts against the radial surface 461 of the drive member 108 under the action of the elastic forces of the return spring 537 and the return spring 538, and therefore the locking means 120 cannot move in the front and rear directions.

In the state as shown in FIGS. 7A-7D, the shaft drive protrusion 448 of the drive shaft 118 in the engagement structure 440 abuts against the limiting wall 464a of the protrusion receiving cavity 246 and is spaced apart from the limiting wall 464b by a distance. When the drive shaft 118 continues to rotate in the direction of J1 (i.e., the clockwise rotation in FIGS. 7C and 7D), the drive shaft 118 drives the hinge arm 115a to rotate by an angle by means of the engagement structure 440, the rotation of the hinge arm 115a drives the flip cover 110 and the other hinge arms of the hinge means 105 to move together, to drive the flip cover 110 to move toward the open position until reaching the position as shown in FIGS. 8A-8D, where the flip cover 110 reaches its open position.

Although the drive member 108 rotates synchronously with the drive shaft 118, the rotation angle of the drive shaft 118 is less than 360° (e.g., approximately 150°), and the notch 445 of the drive member 108 is not yet aligned with the driven end 121 of the locking means 120 again. The engagement surface 542 of the locking means 120 is thus kept abutting against the radial surface 461 of the drive member 108, such that the locking means 120 can be retained in its release position during the opening of the flip cover 110.

Figure 8A:
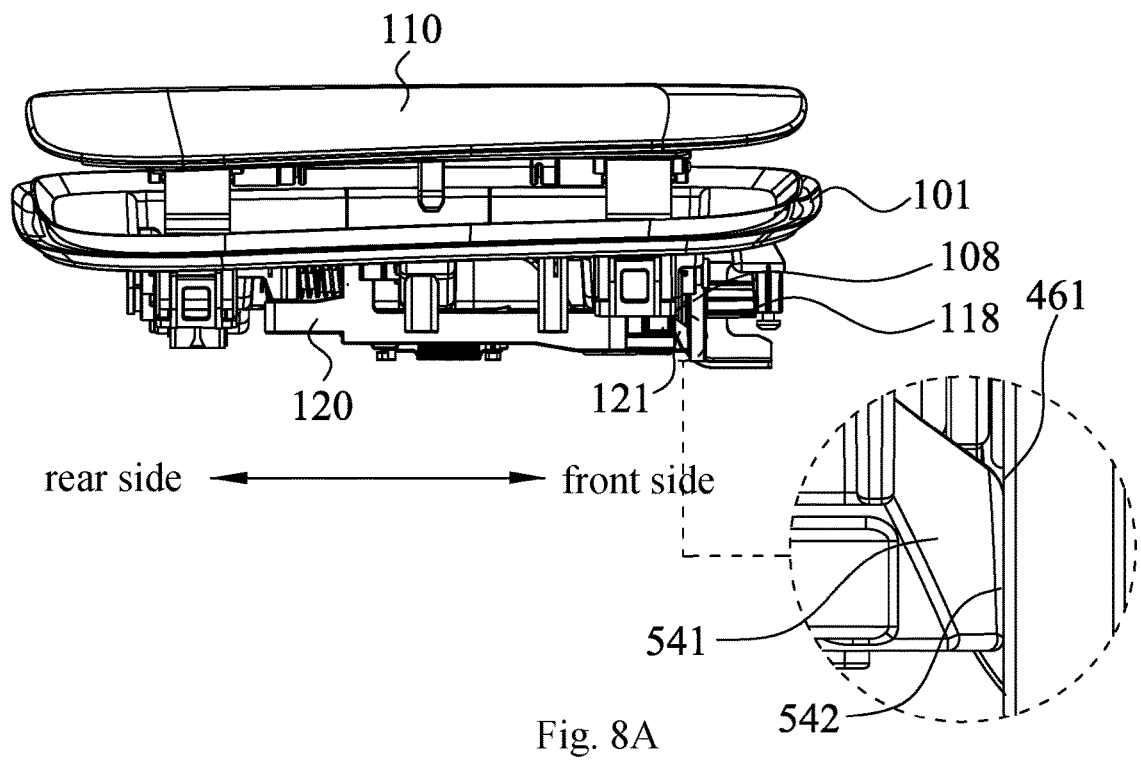
FIG. 8A is a front view of the flip cover assembly 100 when the flip cover assembly is in the open state and the release state.
Figure 8B:
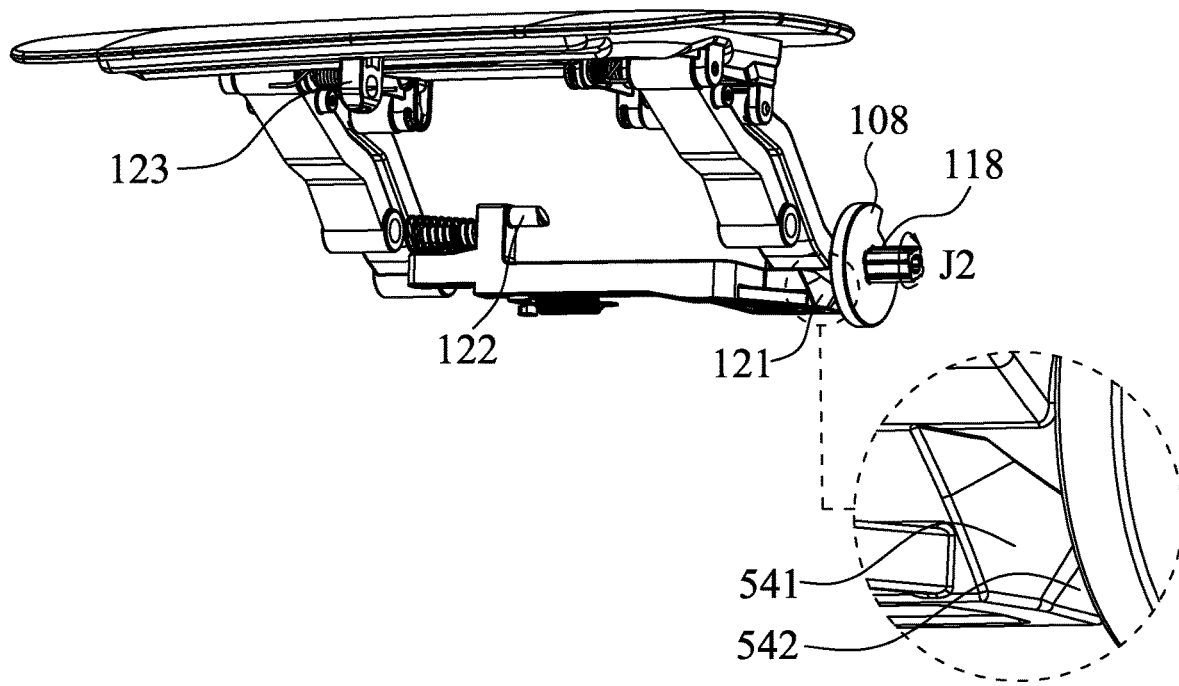
FIG. 8B is a perspective view of the flip cover assembly 100 in FIG. 8A with the base and a power source removed.
Figure 8C:
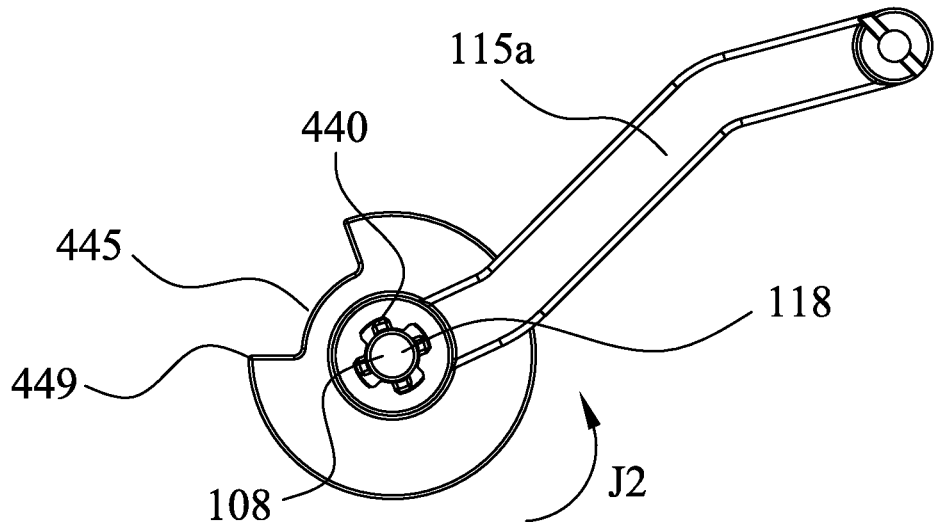
FIG. 8C is a diagram showing the cooperative relationship of the drive shaft, the drive member and the hinge arm in FIG. 8B.
Figure 8D:
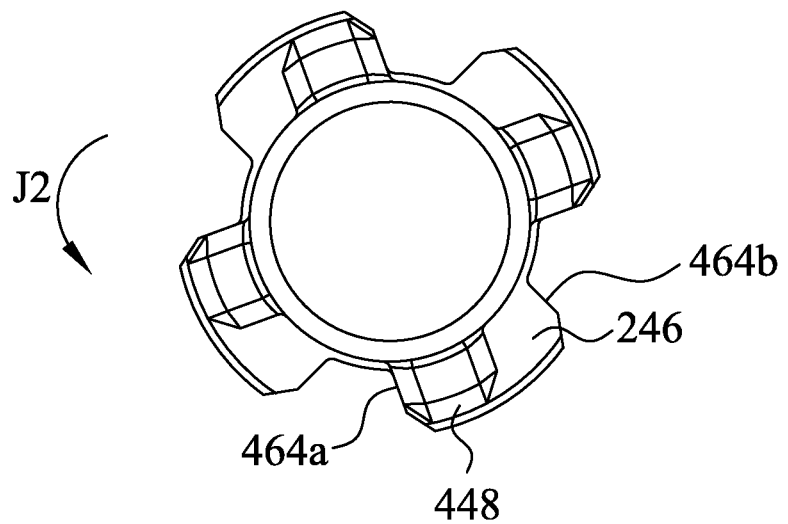
FIG. 8D is an enlarged view of the engagement structure in FIG. 8C.

FIGS. 8A-8D illustrate the specific structure of the flip cover assembly 100 when the flip cover assembly 100 is in the open state and the locking means 120 is in the release position. FIG. 8A shows a front view of the flip cover assembly 100, for illustrating the position of the flip cover 110; FIG. 8B is a perspective view of the flip cover assembly 100 in FIG. 8A, with the base 101 and the power source 150 removed, for illustrating the relative position between the locking means 120 and the drive member 108; FIG. 8C is a diagram showing the cooperative relationship of the drive shaft 118, the drive member 108 and the hinge arm 115a in FIG. 8B, for illustrating rotation angles of the drive member 108 and the hinge arm 115a; and FIG. 8D is an enlarged view of the engagement structure 440 in FIG. 8C.

As shown in FIGS. 8A-8D, the flip cover 110 is in the open position, and the flip cover 110 disengages from the base 101 to expose the refueling port or the charging port 109 in the base 101. The locking hook 123 of the flip cover 110 also disengages from the base 101. In addition, the locking means 120 is retained in its release position.

In the state as shown in FIGS. 8A-8D, the shaft drive protrusion 448 of the drive shaft 118 in the engagement structure 440 abuts against the limiting wall 464a of the protrusion receiving cavity 246 and is spaced apart from the limiting wall 464b by a distance. When the drive shaft 118 rotates toward the limiting wall 464b in a direction of J2 opposite to the direction of J1 (i.e., counterclockwise rotation in FIGS. 8C and 8D), the shaft drive protrusion 448 in the engagement structure 440 and the upstream (in the rotation direction) limiting wall 464b of the protrusion receiving cavity 246 rotate from the separated state to the engaged state. After the shaft drive protrusion 448 is engaged with the limiting wall 464b, the drive shaft 118 drives the hinge arm 115a to rotate, thereby partially closing the flip cover 110 to move the flip cover 110 to the position as shown in FIGS. 9A-9D.

When the drive shaft 118 rotates to the extent that the notch 445 of the drive member 108 is aligned with the driven end 121 of the locking means 120 again, the driven end 121 of the locking means 120, under the action of the return spring 537 and the return spring 538, disengages from the radial surface 461 of the drive member 108, moves toward the front side and toward the interior of the notch 445 and extends into the notch 445. The drive portion 449 of the drive member 108 moves along the driven inclined plane 541 of the locking means 120 again until reaching the position as shown in FIGS. 9A-9D.

Figure 9A:
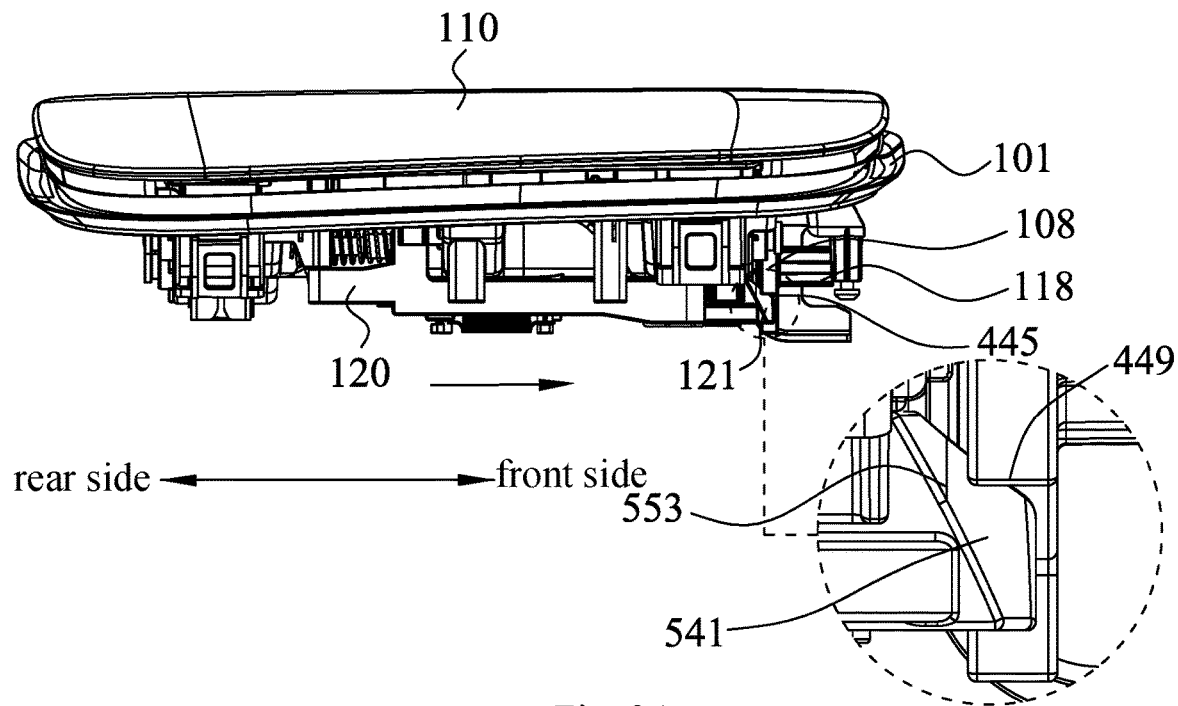
FIG. 9A is a front view of the flip cover assembly 100 during closing of the flip cover assembly.
Figure 9B:
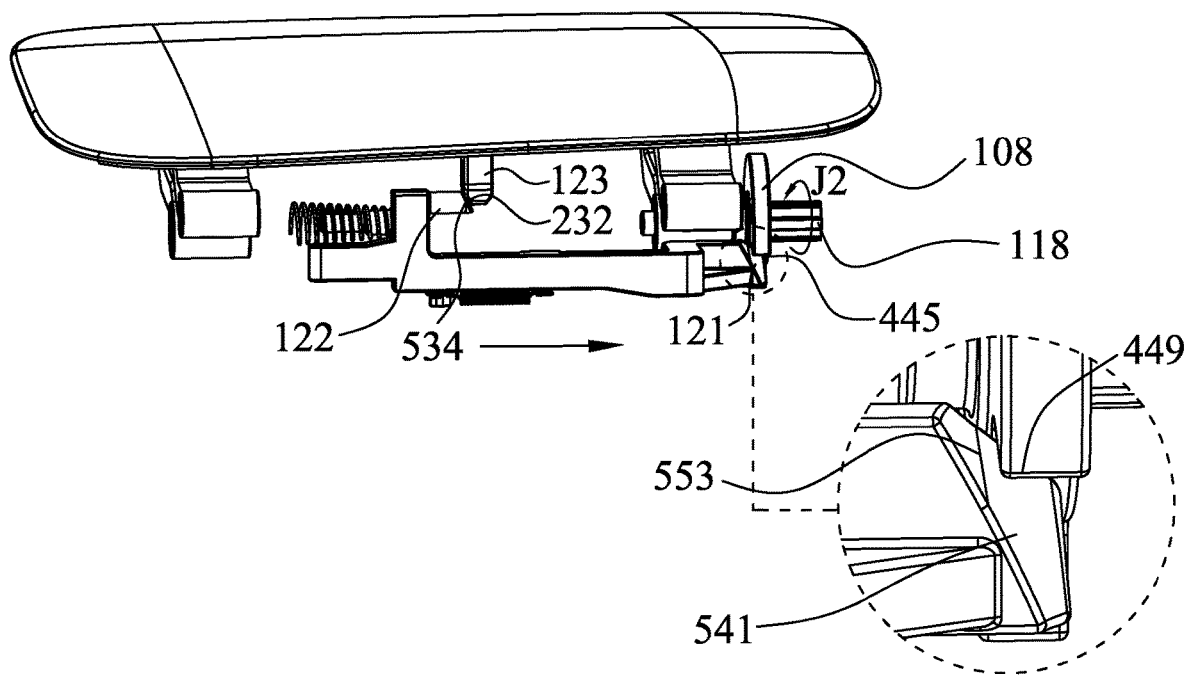
FIG. 9B is a perspective view of the flip cover assembly 100 in FIG. 9A with the base and a power source removed.
Figure 9C:
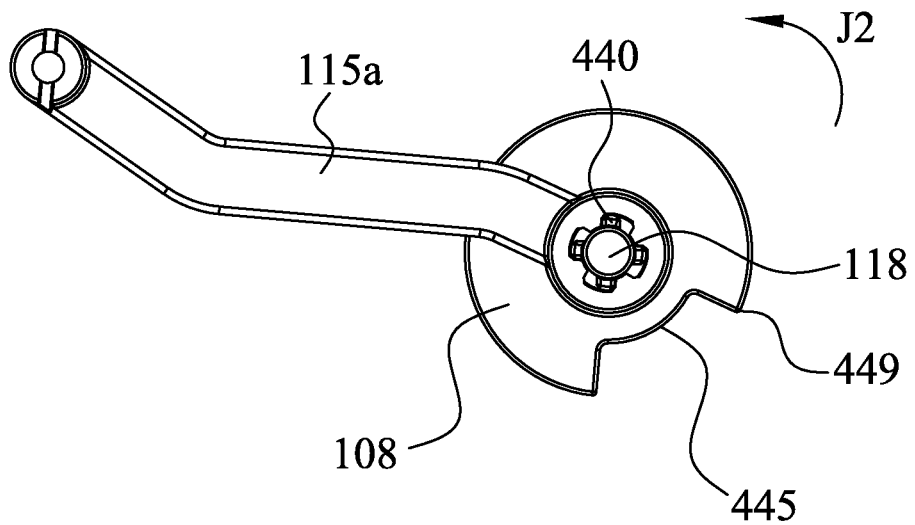
FIG. 9C is a diagram showing the cooperative relationship of the drive shaft, the drive member and the hinge arm in FIG. 9B.
Figure 9D:
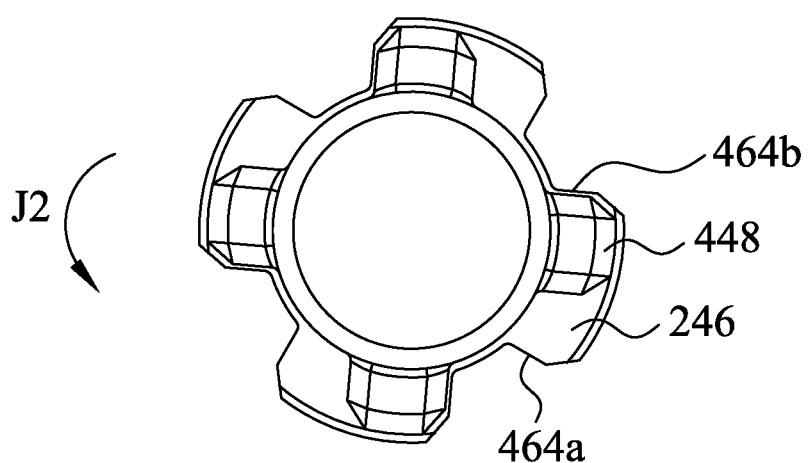
FIG. 9D is an enlarged view of the engagement structure in FIG. 9C.

FIGS. 9A-9D illustrate the specific structure of the flip cover assembly 100 during closing of the flip cover assembly 100. FIG. 9A shows a front view of the flip cover assembly 100, for illustrating the position of the flip cover 110; FIG. 9B is a perspective view of the flip cover assembly 100 in FIG. 9A, with the base 101 and the power source 150 removed, for illustrating the relative position between the locking means 120 and the drive member 108; FIG. 9C is a diagram showing the cooperative relationship of the drive shaft 118, the drive member 108 and the hinge arm 115a in FIG. 9B, for illustrating rotation angles of the drive member 108 and the hinge arm 115a; and FIG. 9D is an enlarged view of the engagement structure 440 in FIG. 9C.

As shown in FIGS. 9A-9D, the flip cover 110 moves toward its closed position, but the flip cover has not yet been moved to the closed position, and therefore the flip cover assembly 100 has not yet been closed completely. The locking hook 123 of the flip cover 110 has not been inserted into the receiving groove 363 of the base 101 completely, and the locking hole 235 of the locking hook 123 fails to be aligned with the locking hole 302 in the base 101. The locking pin 122 of the locking means 120 passes through the locking hole 302 in the base 101, but the inclined plane 534 of the locking pin 122 abuts against the inclined plane 232 at the bottom of the locking hook 123, such that the locking pin cannot be inserted into the locking hole 235 of the locking hook 123 and the locking means 120 has not been reached the locking position.

In the state as shown in FIGS. 9A-9D, the shaft drive protrusion 448 of the drive shaft 118 in the engagement structure 440 still abuts against the limiting wall 464a of the protrusion receiving cavity 246. When the drive shaft 118 continues to rotate in the direction of J2, the drive shaft 118 continues to drive the hinge arm 115a to rotate, and the rotation of the hinge arm 115a drives the flip cover 110 and the other hinge arms of the hinge means 105 to move together until the flip cover 110 is completely closed. The locking hook 123 of the flip cover 110 continues to be inserted into the receiving groove 363 of the base 101, and the locking pin 122 of the locking means 120 slides along the inclined plane 232 until the locking hole 235 is aligned with the locking hole 302 of the base 101, and the locking pin 122 can be inserted into the locking hole 235 through the locking hole 302. The drive portion 449 of the drive member 108 continues to move to the recess 553 along the driven inclined plane 541 of the locking means 120. Accordingly, while the flip cover 110 reaches the closed position as shown in FIGS. 6A-6D, the locking means 120 also reaches the locking position as shown in FIGS. 6A-6D.

In the flip cover actuation assembly 180 and the flip cover assembly 100 of the present disclosure, both the function of locking or releasing the flip cover 110 and the function of driving the flip cover 110 to open or close can be achieved by means of the drive shaft 118 with the drive member 108. Moreover, during opening of the flip cover 110, the function of releasing the flip cover 110 and the function of opening the flip cover 110 are achieved in different time, these two functions will not interfere with each other. During closing of the flip cover 110, the function of locking the flip cover 110 and the function of closing the flip cover 110 are simultaneously achieved. The drive shaft 118 of the present disclosure is simple in structure and easy to assemble, does not require high machining accuracy, and can reduce the cost compared to the flip cover actuation assembly 180 and the flip cover assembly 100 which require multiple drive components (e.g., at least two drive components such as gears) to achieve the two functions.

In addition, in the flip cover assembly 100 of the present disclosure, the locking hook 123 of the flip cover 110 is disposed in the middle of the lower side of the flip cover assembly 100, and compared with a locking hook disposed at the corner of the flip cover, it is possible to better prevent the flip cover from being forcibly opened from the outside of the vehicle under the condition that the flip cover 110 is locked.

Moreover, in the flip cover assembly 100 of the present disclosure, the locking means 120 is disposed on the lower side of the base 101, and the power source 150 is disposed on the front side of the base 101, so that the space of the vehicle body that is occupied by the entire flip cover assembly 100 can be reduced. Since the movement of the locking means 120 between the locking position and the release position requires a movement stroke, the length of the lower side wall 371 of the base 101 is greater than the length of the front side wall 374. The present disclosure uses the length of the lower side wall 371 of the base 101 to cover the movement stroke of the locking means 120, thereby reducing the space occupied by the flip cover assembly 100.

In the flip cover assembly 100 of the present disclosure, the locking means 120 can also be pulled by means of a manual operation of the operator such that the locking means 120 releases the flip cover 110 in the case of failure of the power source 150 due to, for example, insufficient power of a battery of the vehicle.

Although the present disclosure will be described with reference to the specific embodiments shown in the accompanying drawings, it should be understood that the refueling port or charging port flip cover assembly of the present disclosure may have many variations without departing from the spirit, scope and background of the teachings of the present disclosure. Those of ordinary skill in the art will also appreciate that there are different ways to alter the structure in the embodiments disclosed in the present disclosure, and all the alterations fall within the spirit and scope of the present disclosure and the claims.

The invention claimed is:

1. A flip cover actuation assembly for actuating a flip cover movably mounted on a base, comprising:
    a locking means movably disposed on the base, the locking means configured to lock or release the flip cover;
    a hinge means comprising connecting portions through which the hinge means is connected to the flip cover, and receiving portions, and
    a drive shaft and a drive member, the drive member disposed on the drive shaft and rotating with rotation of the drive shaft, the drive member configured to drive the locking means to move, the drive shaft comprising a fitting portion, the hinge means installed around the fitting portion of the drive shaft through the receiving portion, and
    wherein an engagement structure is provided on the receiving portion of the hinge means and the fitting portion of the drive shaft, the engagement structure is configured such that the receiving portion and the fitting portion can be rotatably engaged or rotatably separated, so that the drive shaft can drive the flip cover to move or rotate relative to the hinge means through the hinge means.

2. The flip cover actuation assembly of claim 1, wherein the locking means has a locking position and a release position, the locking means is configured to lock the flip cover when the locking means is in the locking position and release the flip cover when the locking means is in the release position, and
    wherein the engagement structure is configured to: during movement of the locking means from the locking position to the release position, the receiving portion can be rotatably separated from the fitting portion such that the drive shaft rotates relative to the hinge means, and when the receiving portion is rotatably engaged with the fitting portion such that the drive shaft drives the hinge means to rotate so as to open the flip cover, the locking means is in the release position.

3. The flip cover actuation assembly of claim 2, wherein the engagement structure comprises at least one shaft drive protrusion disposed on the fitting portion and at least one protrusion receiving cavity disposed in the receiving portion, the at least one shaft drive protrusion is formed by extending outward from the outer periphery of the drive shaft, the at least one shaft drive protrusion being received in the at least one protrusion receiving cavity, and wherein a circumferential dimension of the at least one protrusion receiving cavity is larger than the circumferential dimension of the at least one shaft drive protrusion.

4. The flip cover actuation assembly of claim 3, wherein the receiving portion comprises a shaft hole, the at least one protrusion receiving cavity extends radially outward from the shaft hole and communicates with the shaft hole.

5. The flip cover actuation assembly of claim 4, wherein the drive shaft and the drive member are integrally formed.

6. The flip cover actuation assembly of claim 4, wherein the drive shaft is connected to the hinge means on one side of the drive member and to a power source on the opposite side.

7. The flip cover actuation assembly of claim 1, wherein the locking means is a locking rod, the movement direction of the locking rod is parallel to the axial direction of the drive shaft.

8. The flip cover actuation assembly of claim 7, wherein the drive member comprises a drive portion rotatable about an axis of the drive shaft,
    wherein the locking rod is provided with a driven end, the driven end is provided with a driven inclined plane, the driven inclined plane is obliquely disposed relative to the movement direction of the locking rod, and the driven inclined plane is disposed facing the drive portion, and
    wherein the drive portion and the driven inclined plane are configured such that, with rotation of the drive portion, the drive portion can contact the driven inclined plane to drive the locking rod to move from the locking position to the release position.

9. The flip cover actuation assembly of claim 8, wherein the driven end further comprises an engagement surface at an end of the driven inclined plane, the locking rod is configured such that when the locking rod reaches the release position, the engagement surface can abut against the drive member.

10. The flip cover actuation assembly of claim 9, wherein the flip cover actuation assembly further comprises a return spring connected between the locking rod and the base, the return spring being configured to be compressed during movement of the locking rod toward the release position, after the locking rod reaches the release position, the return spring and the drive member collectively keeping the locking rod in the release position, and
    wherein a return force of the return spring can move the locking rod from the release position to the locking position.

11. The flip cover actuation assembly of claim 10, wherein the drive member is a drive disk having a radially recessed notch on a circumferential surface thereof, the drive portion is formed by the notch and the circumferential surface of the drive disk together, and
    wherein the drive disk is configured such that the notch receives the driven end of the locking rod when the drive portion contacts the driven inclined plane.

12. A refueling port or charging port flip cover assembly, comprising:
    a base;
    a flip cover rotatably mounted on the base, and
    the flip cover actuation assembly of claim 1 disposed on the base.

* * * * *